United States Patent
Stein et al.

(10) Patent No.: US 10,979,897 B2
(45) Date of Patent: Apr. 13, 2021

(54) RANKING IDENTITY AND SECURITY POSTURE FOR AUTOMOTIVE DEVICES

(71) Applicant: Saferide Technologies Ltd., Tel-Aviv (IL)

(72) Inventors: Yehiel Stein, Ramat HaSharon (IL); Yossi Vardi, Tel-Aviv (IL)

(73) Assignee: Saferide Technologies Ltd., Tel-Aviv (IL)

( * ) Notice: Subject to any disclaimer, the term of this patent is extended or adjusted under 35 U.S.C. 154(b) by 0 days.

(21) Appl. No.: 16/964,217

(22) PCT Filed: Jan. 21, 2019

(86) PCT No.: PCT/IL2019/050078
§ 371 (c)(1),
(2) Date: Jul. 23, 2020

(87) PCT Pub. No.: WO2019/145939
PCT Pub. Date: Aug. 1, 2019

(65) Prior Publication Data
US 2021/0044967 A1 Feb. 11, 2021

Related U.S. Application Data

(60) Provisional application No. 62/620,501, filed on Jan. 23, 2018.

(51) Int. Cl.
*H04W 12/06* (2021.01)
*H04W 12/00* (2021.01)
(Continued)

(52) U.S. Cl.
CPC ....... *H04W 12/0052* (2019.01); *H04L 9/0836* (2013.01); *H04W 4/44* (2018.02);
(Continued)

(58) Field of Classification Search
CPC ......... H04W 12/003; H04W 12/00505; H04W 12/00506; H04W 12/0052;
(Continued)

(56) References Cited

U.S. PATENT DOCUMENTS

| 2008/0232595 A1 | 9/2008 | Pietrowicz et al. |
| 2015/0094991 A1 | 4/2015 | John et al. |

(Continued)

FOREIGN PATENT DOCUMENTS

| WO | WO 2017/153421 | 9/2017 |
| WO | WO 2019/145939 | 8/2019 |

OTHER PUBLICATIONS

International Preliminary Report on Patentability dated Aug. 6, 2020 From the International Bureau of WIPO Re. Application No. PCT/IL2019/050078. (6 Pages).

(Continued)

*Primary Examiner* — Minh Dinh

(57) ABSTRACT

A computerized method of evaluating authenticity of automotive devices, comprising a local authorization entity (AE) adapted to manage identity authentication for a group of automotive devices located in an associated geographical area. The local AE provides, to a first automotive device of the group, an AE identity certificate comprising an encryption key of the local AE and signed with a higher level AE's encryption key. The first automotive device uses the higher level AE's encryption key to decrypt the AE identity certificate and retrieve the local AE's encryption key. The first automotive device uses the local AE's encryption key to verify an identity certificate created by the local AE for a second automotive device of the group. The first automotive device establishes a session with the second automotive device according to an identity posture score extracted from the identity certificate of the second automotive device.

17 Claims, 7 Drawing Sheets

(51) Int. Cl.
    *H04W 4/44*          (2018.01)
    *H04W 12/04*        (2021.01)
    *H04L 9/08*          (2006.01)

(52) U.S. Cl.
    CPC ... *H04W 12/003* (2019.01); *H04W 12/04031* (2019.01); *H04W 12/0609* (2019.01); *H04L 2209/84* (2013.01)

(58) Field of Classification Search
    CPC ....... H04W 12/04031; H04W 12/0609; H04W 4/40; H04W 4/44; H04W 4/46; H04L 63/062; H04L 63/064; H04L 63/0823; H04L 2209/84
    See application file for complete search history.

(56) References Cited

U.S. PATENT DOCUMENTS

2015/0318996 A1* 11/2015 van Roermund ... H04L 63/0823
                                                                 713/158
2020/0045552 A1* 2/2020 Kim ................. H04W 12/0802

OTHER PUBLICATIONS

International Search Report and the Written Opinion dated Apr. 23, 2019 From the International Searching Authority Re. Application No. PCT/IL2019/050078. (15 Pages).

\* cited by examiner

RANKING IDENTITY AND SECURITY POSTURE FOR AUTOMOTIVE DEVICES

RELATED APPLICATION APPLICATIONS

This application is a National Phase of PCT Patent Application No. PCT/IL2019/050078 having International filing date of Jan. 21, 2019, which claims the benefit of priority under 35 USC § 119(e) of U.S. Provisional Patent Application No. 62/620,501 filed on Jan. 23, 2018. The contents of the above applications are all incorporated by reference as if fully set forth herein in their entirety.

FIELD AND BACKGROUND OF THE INVENTION

The present invention, in some embodiments thereof, relates to evaluating identity posture of automotive devices, more particularly, but not exclusively, to evaluating identity posture of automotive devices using a global geographically segmented hierarchical identity authorization system.

The automotive environment has rapidly evolved in recent years and is likely to witness even more dramatic developments. Autonomous vehicles as well as a plurality of automated systems used for a plurality of applications ranging from, for example, autonomous driving, driving safety, driver experience through traffic control to infotainment and/or the like are becoming more common by the day.

Such automated and autonomous systems may naturally utilize many diverse automotive devices which may exchange ever growing amounts of data among them to maintain proper and efficient operation of such systems.

SUMMARY OF THE INVENTION

According to a first aspect of the present invention there is provided a computer implemented method of evaluating authenticity of automotive devices, comprising using one or more processor of a local authorization entity (AE) which is part of a geographically segmented hierarchical identity authorization system adapted to manage identity authentication of a plurality of automotive devices of a global automotive environment. The local AE is adapted to manage the identity authentication for a group of the plurality of automotive devices currently located in an associated geographical area. The one or more processors are adapted for:
  Receiving from a first automotive device of the group, over a network, a request for an AE identity certificate of the local AE.
  Providing the AE identity certificate comprising an identity posture score and an encryption key of the local AE, the AE identity certificate is signed with an encryption key of a higher level AE, the first automotive device decrypts the AE identity certificate using the encryption key of the higher level AE to retrieve the identity posture score and the encryption key of the local AE.
  Wherein after verifying the identity of the local AE based on the identity posture score of the local AE, the first automotive device uses the encryption key of the local AE to verify an identity certificate received from a second automotive device of the group via one or more communication channels. The identity certificate comprises an identity posture score calculated for the second automotive device by the local AE and signed using the encryption key of the local AE. The first automotive device establishes a communication session with the second automotive device according to the identity posture score.

The automotive devices may greatly benefit from data exchanged between them for the plurality of applications. By providing a trusted robust and cryptographic based encryption authentication systems and methods for managing and estimating the identity posture for the automotive devices, the automotive devices may be able to accurately and efficiently evaluate the identity posture of each other. This may significantly reduce and potentially completely prevent exposure of the automotive devices to malicious devices, adversaries, cyber-attack, identity theft and/or the like, prevent usage of data received from such malicious devices and/or the like. This may further allow the automotive devices to evaluate susceptibility of other automotive device(s) to operational failures and determine whether to use data received from the other automotive device(s), for which applications and/or to what extense. Moreover, the distributed construction of the identity authorization system may allow for high scalability since while the amount of automotive devices, in particular in a global automotive environment may be extremely large, using the distributed identity authorization system, each automotive device may interact with its local AE thus significantly localizing the interaction between the automotive devices and the identity authorization system.

According to a second aspect of the present invention there is provided a system for evaluating authenticity of automotive devices, comprising using one or more processors of a local authorization entity (AE) which is part of a geographically segmented hierarchical identity authorization system adapted to manage identity authentication of a plurality of automotive devices of a global automotive environment. The local AE is adapted to manage the identity authentication for a group of the plurality of automotive devices currently located in an associated geographical area. The processor(s) is adapted to execute a code, the code comprising;
  Code instructions to receive from a first automotive device of the group, over a network, a request for an AE identity certificate of the local AE.
  Code instructions to provide the AE identity certificate comprising an identity posture score and an encryption key of the local AE, the AE identity certificate is signed with an encryption key of a higher level AE, the first automotive device decrypts the AE identity certificate using the encryption key of the higher level AE to retrieve the identity posture score and the encryption key of the local AE.
  Wherein the first automotive device uses the encryption key of the local AE to verify an identity certificate received from a second automotive device of the group via one or more communication channels. The identity certificate comprises an identity posture score calculated for the second automotive device by the local AE and signed using the encryption key of the local AE. The first automotive device establishes a communication session with the second automotive device according to the identity posture score.

In a further implementation form of the first and/or second aspects, the hierarchical identity authorization system comprises a top level (root) global AE and a plurality of AE levels, each of the plurality of AE levels comprising a plurality of AEs, each of the AEs in the a lowest AE level is adapted to manage the identity posture evaluation for a group of the plurality of automotive devices currently located in a respective associated geographical area, each higher level AE is associated with a plurality of lower level AEs. Due to its hierarchically construction, the identity authorization system may be highly scalable. AEs may be added, removed, split, joined and/or modified at any of the AE levels to adapt to changes, fluctuations and/or variations in the automotive environment.

In a further implementation form of the first and/or second aspects, each of the plurality of automotive devices is initially registered at the root AE which assigns a unique encryption key to each automotive device. Registering to the root AE and hence establishing trust with the root AE may allow each of the automotive devices to establish trust with lower level AEs using the signature of the root AE for authenticating the lower level AEs.

In an optional implementation form of the first and/or second aspects, at least some of the plurality of AEs of one or more of the plurality of AE levels are associated with at least partially overlapping geographical areas. Assigning overlapping geographical areas to several AEs may allow for redundancy in case of failures of one or more of the automotive devices to communicate with one or more of the AEs. Moreover, overlapping between geographical areas may allow for significantly improved scalability of the identity authorization system to adapt to changes, fluctuations and/or increase of the automotive devices in a certain geographical area(s) by assigning multiple AEs to a certain geographical area.

In an optional implementation form of the first and/or second aspects, one or more lower level AEs are associated with an alternative higher level AE which signs the AE identity certificate of the lower level AE in case the higher level AE is not accessible. The alternative AE(s) may allow for redundancy to verify proper operation and maintain the hierarchical structure of the identity authorization system in the event(s) of failure to communicate with one or more of the AEs, for example, a loss of communication with the AE, a malfunction of the AE, a maintenance of the AE and/or the like. When experiencing such failures to communicate with their originally allocated higher level AE, one or more of the AEs may communicate with the alternative higher level AE(s).

In a further implementation form of the first and/or second aspects, the first automotive device repeats the request for the AE identity certificate of the higher level AE signed with an encryption key of a further higher level AE until reaching an AE having an encryption key available to the first automotive device. This may allow each of the automotive devices to establish trust with lower level AEs using the signature of trusted higher level AE(s) for authenticating the lower level AEs.

In a further implementation form of the first and/or second aspects, the local AE calculates the identity posture score for one or more identity security attributes of one or more automotive devices of the group, the one or more identity security attributes is a member of a group consisting of: a type of the one or more automotive devices, a software module executed by the one or more automotive devices, a version of the software module, a security measure applied by the one or more automotive devices, a version of the security measure, a performance of a feature of the automotive device, a performance of a hardware component used by the automotive device and a time period since a most recent verification of the identity of the one or more automotive devices. Calculating the identity posture score according to an analysis of a plurality of security and/or operational parameters may yield an accurate score which may be efficiently used by the automotive devices to evaluate each other's identity posture and/or operational robustness and establish a level of trust accordingly.

In an optional implementation form of the first and/or second aspects, the local AE calculates an overall identity posture score by aggregating the identity posture score calculated for a plurality of identity security attributes of the one or more automotive devices. The aggregated identity posture score may be used by one or more of the automotive devices to quickly and simply determine an overall trust level for the other automotive device(s) and establish the communication session and/or use exchanged data accordingly.

In an optional implementation form of the first and/or second aspects, the local AE:

Calculates the identity posture score for each automotive device of the group when each automotive device enters the associated geographical area for a first time.

Provides the identity certificate comprising the identity posture score to each automotive device.

By creating the identity certificate for the automotive device(s) in advance and/or independently of communication session(s) the automotive device may be involved in, the identity certificate may be readily available to the respective automotive device thus significantly reducing the identity evaluation phase when communicating with other automotive device(s) since interaction with the local AE in real time is not required.

In a further implementation form of the first and/or second aspects, the identity certificate of the second automotive device is valid for a predefined time period after which the identity certificate is rejected by the first automotive device. Expiration of the identity certificate of the automotive devices after a certain time may force periodic re-issue of the identity certificate thus verifying that the identity certificate is updated with the latest security and/or operational performance characteristics of each automotive device.

In a further implementation form of the first and/or second aspects, the first automotive device request the AE identity certificate of the local AE when entering the associate geographical area for a first time. By verifying the identity of the local AE when entering its associated geographical area and establishing trust with the local AE, the automotive devices may avoid interaction with the local AE in real time during the communication session with other automotive device(s) since the encryption key of the local AE is already available to them.

In a further implementation form of the first and/or second aspects, the first automotive device stores the encryption key of the local AE for decrypting the identity certificate of one or more automotive devices of the group for establishing a communication session with the one or more automotive devices. Storing the encryption key of the local AE may further allow the automotive devices to avoid interaction with the local AE in real time while establishing the communication session with the other automotive device(s).

In an optional implementation form of the first and/or second aspects, the encryption key of the local AE expires every predefined time period to force the first automotive device to periodically request an updated encryption key from the local AE. Expiration of the encryption key of the local AE may force periodic verification of the local AE by the group of automotive device located in the associated geographical area. This may prevent malicious parties impersonating as the local AE to falsely communicate with the automotive devices and thus reduce exposure of the automotive devices to the malicious parties.

In a further implementation form of the first and/or second aspects, each of the plurality of automotive devices is a member of a group consisting of: a mobile automotive device and a stationary automotive device. Supporting both mobile and stationary automotive devices may allow easy adaptation of the identity authorization system to the rapidly evolving automotive environment in which the automotive devices may be deployed in a single geographical area (segment) and/or dynamically move between different geographical areas.

In a further implementation form of the first and/or second aspects, the mobile automotive device is a vehicle mounted device comprising one or more members of a group consisting of: a vehicular device and a pedestrian carried device. The automotive environment is constantly evolving and enhancing to present a variety of mobile devices. Therefore by supporting such a wide variety of mobile automotive devices, the identity authorization system may offer major benefits for the automotive devices it serves.

In a further implementation form of the first and/or second aspects, the stationary automotive device is a member of a group consisting of: a road infrastructure object and a traffic control system, wherein the road infrastructure object comprises one or more members of a group consisting of: a road sign, a traffic light, a road marking and a geolocation identification unit. The automotive devices infrastructure is also rapidly advancing. Therefore by supporting such a wide variety of stationary infrastructure automotive devices, the identity authorization system may offer major benefits for the automotive devices it serves.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 6:
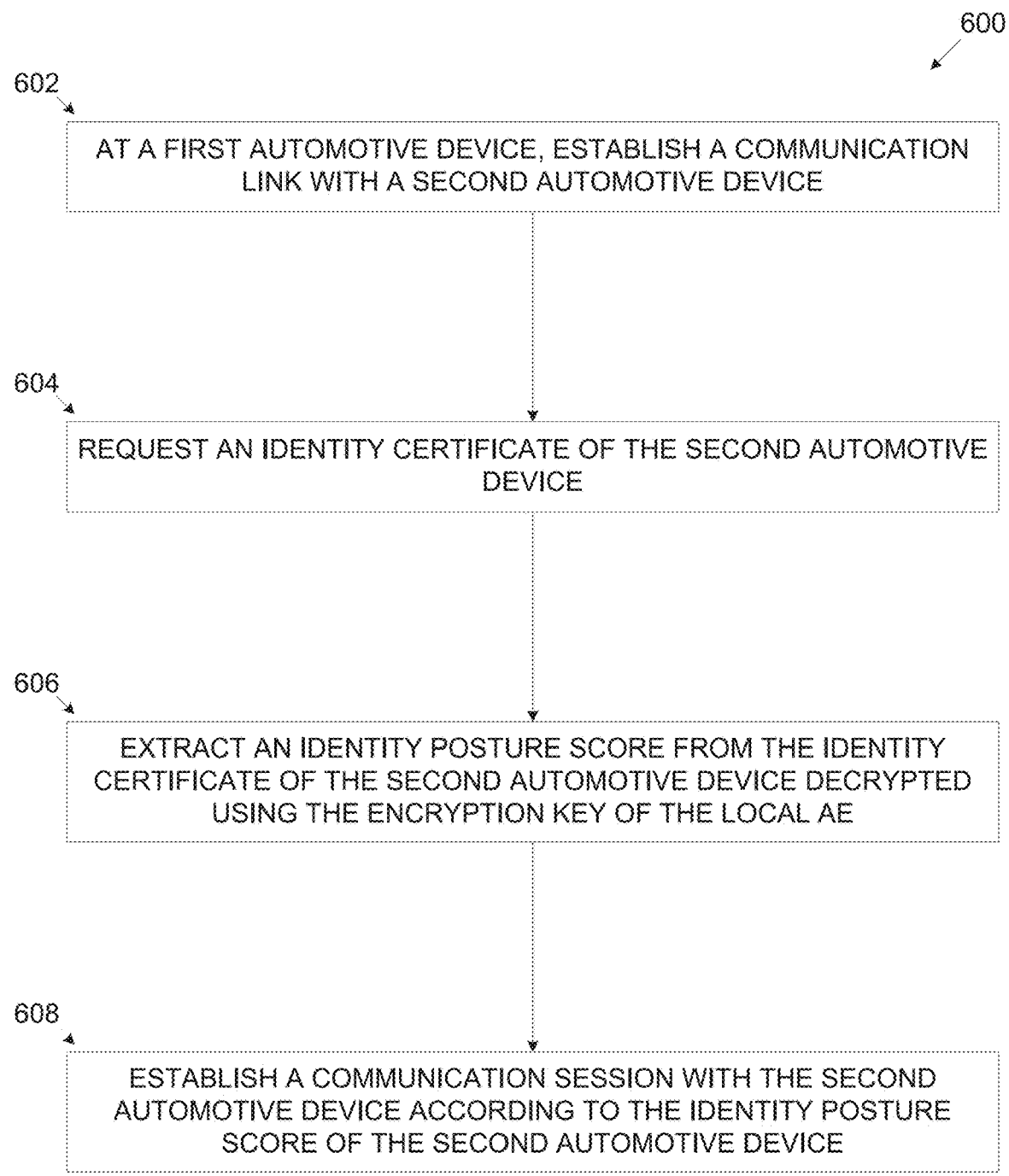
Figure 7:
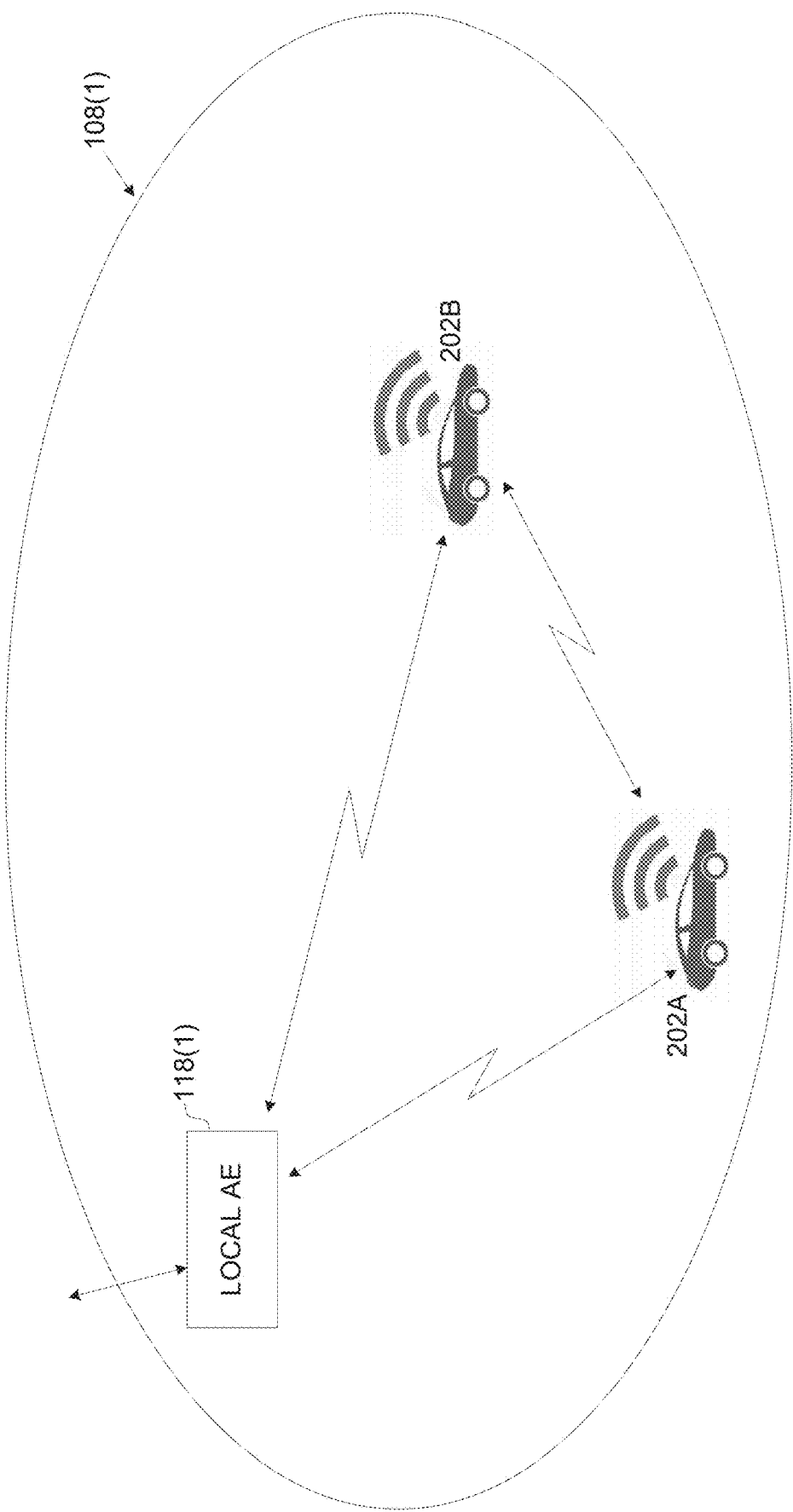

FIG. 6 is a flowchart of an exemplary process executed by an automotive device to establish a communication session with another automotive device based on an identity posture score assigned to the other automotive device by a local AE, according to some embodiments of the present invention; and FIG. 7 is a schematic illustration of an exemplary automotive environment in which an automotive device establishes a communication session with another automotive device based on an identity posture score assigned to the other automotive device by a local AE, according to some embodiments of the present invention.

DESCRIPTION OF SPECIFIC EMBODIMENTS OF THE INVENTION

The present invention, in some embodiments thereof, relates to evaluating identity posture of automotive devices, more particularly, but not exclusively, to evaluating identity posture of automotive devices using a global geographically segmented hierarchical identity authorization system.

According to some embodiments of the present invention, there are provided methods, systems and computer program products for a geographically segmented hierarchical identity authorization system which may be used in global automotive environment (ecosystem) for evaluating identity posture of automotive devices.

A plurality of automotive devices may use one or more V2X (Vehicle-to-everything) protocols, for example, V2I (Vehicle-to-Infrastructure), V2V (Vehicle-to-vehicle), V2P (Vehicle-to-Pedestrian), V2D (Vehicle-to-device) and/or the like to communicate with each other over one or more wireless communication channels, for example, a cellular link (e.g. a 5G network), a Wireless LAN (WLAN) link, a Dedicated Short Range Communication (DSRC) channel, a Radio Frequency (RF) channel and/or the like. The automotive devices may include mobile automotive devices, for example, vehicular devices, vehicle mounted devices, pedestrian carried devices and/or the like. Such mobile automotive devices may include for example, an autonomous driving system, a navigation system, a safety system, a communication system and/or the like. The automotive devices may further include stationary automotive devices such as, for example, road infrastructure objects (e.g. traffic lights, traffic signs, crosswalks, etc.), traffic control systems, geolocation identification units and/or the like.

The automotive devices may communicate with each other for a plurality of applications, for example, autonomous vehicles control, vehicular safety, traffic control, navigation, infotainment and/or the like. As such one or more of the automotive devices may base operational decisions on input data received from other automotive device(s). Such operational decisions may often be critical as they may have severe implications and/or consequences, for example, collisions, accidents, damage, injuries and/or casualties. For example, an autonomous vehicle system may control a respective vehicle (e.g. accelerate, break, turn and/or the like) according to input data received from one or more other automotive devise, for example, another autonomous vehicle system controlling another vehicle, a networked traffic light capable of reporting a state of the traffic light (i.e. red, yellow, green light) and/or the like.

Controlling the vehicle according to the input data may therefore require the automotive devices to verify that the input data provided by the other automotive devices is accurate and is provided by legitimate (valid) automotive devices. Such automotive devices may therefore need to first establish a confidence level with respect to the legitimacy and/or operational robustness of the other automotive device(s) before using the input data received from the other automotive device(s). Doing so the automotive device(s) may avoid exposure and/or usage of data provided by malicious devices (adversary) impersonating as legitimate automotive devices and/or by inferior automotive devices which may experience poor performance and/or operational failures.

The identity authorization system may therefore be used to support the automotive devices in evaluating the confidence level by estimating an identity posture for the automotive device(s) and/or rating the operational robustness of the automotive device(s). Such an identity authorization system may be trusted by the plurality of automotive devices in the automotive environment and the identity authorization system may therefore serve as a reliable intermediator for managing identity authentication as well as evaluating operational robustness.

The identity authorization system may be constructed as a distributed hierarchical system which is geographical segmented since the automotive environment is typically geographically oriented. The identity authorization system may comprise a plurality of Authorization Entities (AEs) arranged in a plurality of AE levels and governed by a global root AE at the top AE level. Each of the AEs may be utilized by one or more computing devices, for example, a server, a processing node, a cluster of processing nodes and/or the like comprising one or more processors. Optionally one or more of the AEs is implemented as one or more networked services and/or platforms, for example, a cloud service, a Software as a Service (SaaS), a Platform as a Service (PaaS) and/or the like.

The root AE may be adapted to control identity authentication for automotive devices located in a global geographical area covering all the geographical areas defined for the identity authorization system, for example, the world, a continent, a country and/or the like. Each of the AEs in each subsequent lower AE levels may be adapted to control the identity authentication in decreasingly smaller geographical areas, for example, a country, a canton, a county and/or the like until AEs of the lowest AE level may be adapted to control the identity authentication for significantly small basic geographical areas, for example, a street, a block, a neighborhood and/or the like. This means that each AE of the lowest AE level is associated with a respective geographical area and each higher level AE is associated one or more AE of a subsequent lower AE level. This may be regarded as the higher level AEs are associated with extended geographical areas. However in practice only the lowest level AEs actually communicating with the automotive devices in the automotive devices. The higher level AEs are correlated with their respective lower level AEs to support the automotive devices in establishing trust, i.e. verify the identity of the respective lowest level AE as described herein after.

The geographical segmentation of the identity authorization system may be based on one or more geographical attributes of the geographical areas associated with the AEs, for example, a size, a population density, a capacity of automotive devices, a traffic load and/or the like. For example, highly populated geographical areas, for example, a city, a suburb and/or the like may be segmented to many relatively small basic geographical areas each associated with a respective AE. Lightly populated geographical areas, for example, a country side, a rural area and/or the like on the other hand may be segmented to relatively large basic geographical areas thus requiring fewer AEs. The geographical segmentation of the identity authorization system may be based on state and/or municipal segmentation such that the geographical areas are defined substantially according to municipal jurisdiction borders. Additionally and/or alternatively the identity authorization system may be segmented according to longitude and/or latitude lines such that each AE is associated with a respective geographical region having borders defined by longitude and/or latitude point values.

The identity authorization system may use an identification system which may be available and/or defined for the automotive devices such that each of the automotive devices in the automotive environment is assigned a unique identifier (ID). Each automotive device of the automotive environment is initially registered with its unique ID in the identity authorization system, specifically at the root AE. The registration may be done by authorized entities only, for example, a vehicle manufacturer, a system manufacturer, a certified installer and/or the like after verifying their genuine identity. During the registration to the identity authorization system, each registered automotive device may establish trust with the root AE and receive an encryption key associated with the root AE.

The automotive devices registered to the identity authorization system may interact with their respective local AE of the lowest AE level which is associated with the respective geographical area in which the automotive devices are currently located. The automotive devices may interact with the local AE serving as an intimidator between automotive devices which need to evaluate the authenticity and/or reliability of each other.

However, in order to use the local AE, each automotive device first needs to establish trust in the local AE, i.e. verify the identity of the local AE. This may be done by providing the automotive device an AE identity certificate created for the local AE by the subsequent higher level AE associated with the local AE. The subsequent higher level AE may further sign the AE identity certificate of the local AE thus declaring its authenticity. The subsequent higher level AE may sign the AE identity certificate by encrypting it using an encryption key exclusively associated with the subsequent higher level AE.

In case the automotive device previously interacted with the subsequent higher level AE, the automotive device may already have the encryption key of the subsequent higher level AE as it may have already verified its identity and obtained its encryption key. In such case the automotive device may use the encryption key of the subsequent higher level AE to authenticate the AE identity certificate of the local AE and verify the identity of the local AE. The AE identity certificate of the local AE may further include the encryption key associated with the local AE thus the encryption key of the local AE is now available to the automotive device. Typically, the automotive device locally stores (caches) the encryption key of the local AE for use during future encounters with one or more other automotive devices.

In case the automotive device does not have the encryption key of the subsequent higher level AE, the process may be iteratively repeated and propagated through the hierarchical structure of the identity authorization system until reaching an AE which is trusted by the automotive device, i.e. the identity of the trusted AE was verified by the automotive device. The iterative process may optionally repeat until reaching the root AE, specifically in case it is the first time the automotive device interacts with one of the AEs. For example, after manufacturing of the automotive device, after deployment of the automotive device, after installation of the automotive device, after activation of the automotive device and/or the like.

The automotive device may typically verify the identity of the local AE and obtain its associated encryption key when entering for the first time the geographical area associated with the local AE.

Each of the automotive devices may have a respective identity certificate created for it by the respective local AE associated with the geographical area in which the automotive device is currently located. The identity certificates are signed (i.e. encrypted) by the local AE using its uniquely associated encryption key such that when interacting with each other, the automotive devices may verify that the identity certificate of the other party (automotive device) is genuinely created and signed by the local AE. The identity certificate may be created for one or more of the automotive devices when the automotive device enters for the first time the geographical area associated with the local AE. Moreover, one or more of the automotive devices may locally store (cache) its identity certificate for use during future encounters with one or more other automotive devices.

The identity certificate created for each automotive device may include, for example, a feature vector comprising an identity posture score calculated by the local AE for one or more identity security attributes reported by the automotive device which may reflect the confidence level the identity posture of the automotive device. The identity security attributes may further reflect the susceptibility (or robustness) of the automotive device to operational failures and/or reflect performance level of the automotive device.

The identity security attributes may include, for example, a type of the automotive device, a software module executed by the automotive device (e.g. an Operating System, an application, etc.), a version of the software module, a patch level and/or version for the software module, a security measure applied by the automotive device (e.g. a firewall, an Intrusion Prevention System (IPS), an anti-virus tool, an anti-malware tool and/or any other relevant protection suite), a version of the security measure, a capability of the automotive device, a performance indication of one or more features and/or hardware components (e.g. a positioning sensor, a distance sensor, an acceleration sensor, etc.) of the automotive device and/or the like. The identity security attributes may further include a time period since the most recent identity certificate was created for the automotive device by one of the AEs. A long time period since the most recent identity certificate creation may indicate the identity of the automotive device is not frequently verified and may lead to a lower identity posture score. In contrast, frequent identity certificate creation for the automotive device may be ranked with a significantly high identity posture score.

The local AE may further calculate an overall identity posture score for the automotive device by aggregating the identity posture score calculated for multiple and optionally all of the identity security attributes.

The identity posture score calculated for the identity security attribute(s) as well as the aggregated identity posture score may be highly indicative of the probability that the automotive device may be compromised, fail to operate properly and/or perform poorly. For example, in case the automotive device applies extreme and up to date security measures, the automotive device is less likely to be compromised and hence the identity posture score may be significantly high and vice versa. In another example, in case the automotive device executes the latest software module, patches and/or the like, the automotive device is less likely to experience operational failures and hence the identity posture score may be significantly high and vice versa. In another example, in case the automotive device uses high accuracy and/or high performance hardware component(s), the automotive device is likely to provide high accuracy data and vice versa.

When two automotive devices establish a communication session between them they may use the identity certificates created for them by the local AE to evaluate each other's identity posture indicating their respective security robustness, operational robustness and/or performance.

Therefore prior to establishing the communication session with each other, each of the two automotive devices may first request the local AE to provide it with the identity certificate as described herein above. Moreover, in order to interact with the local AE, each of the automotive devices must first verify the identity of the local AE and obtain its associated encryption key as described herein above.

Once the two automotive devices have their respective identity certificates and the encryption key of the local AE serving as a trusted mediator, the automotive devices may exchange their respective identity certificates. Having the encryption key of the local AE, each automotive device may extract the identity posture score calculated by the local AE for the identity security attribute(s) of the other automotive device as well as the aggregated identity posture score if exists.

One or more of the automotive devices may then evaluate the identity posture, the operational robustness and/or the performance of the other automotive device according to the identity posture score assigned to the identity security attribute(s) of the other automotive device and optionally based on the aggregated identity posture score assigned to the other automotive device.

Based on the evaluation one or more of the automotive devices may determine whether to establish the communication session with the other automotive device, determine whether to use input data received from the other automotive device, use it to a certain extent or not use it all.

The identity authorization system may present significant benefits for automotive devices in an automotive environment (ecosystem) in particular a global automotive environment. While the automotive devices may greatly benefit from data exchanged between them for the plurality of applications, the originating source of the exchanged data must be first determined as legitimate or not. By providing a trusted robust and cryptographic based encryption systems and methods for managing and estimating the identity posture for the automotive devices in an automotive environment, the automotive devices may be able to accurately and efficiently evaluate the identity posture of each other. This may significantly reduce exposure of the automotive devices, for example, usage of data received from one or more automotive devices which are compromised, hijacked and/or the like as well as exposure to one or more malicious devices and/or cyber threats, for example, a cyber-attack, an identity theft and/or the like. In addition, based on the evaluation of the susceptibility of the other automotive device(s) to operational failures and evaluation of the operational performance of the other automotive device(s), the automotive device may determine whether to use data received from the other automotive device(s).

Moreover, due to the hierarchically construction, the identity authorization system may be highly scalable. AEs may be added, removed, split, joined and/or modified at any of the AE levels to adapt to one or more characteristics of the geographical area and/or the automotive environment the identity authorization system is deployed in and defined for. For example, in case of an increase in the overall geographical area defined for the identity authorization system, one or more AEs associated with the additional geographical areas may be added in one or more of the AE levels. Optionally, one or more of the AEs may be associated with increased geographical area to cover the additional geographical areas. In another example, assuming a certain geographical area becomes highly dense with traffic. In such case one or more AEs and optionally a completely new AE level may be added and associated with smaller geographical areas for efficient management of the identity posture in the crowded area.

Furthermore, the distributed construction of the identity authorization system may allow for further scalability. The amount of automotive devices, in particular in a global automotive environment may be extremely large, possibly ranging to tens and even hundreds of millions of devices. Managing such a huge number of devices by a centralized system may be highly inefficient since the plurality of automotive devices may be registered in a central entity (server, system, etc.) which may be flooded with a huge number of identity certificate requests and queries originating from the local AEs. In the distributed identity authorization system on the other hand each automotive device may interact with its local AE thus significantly localizing the interaction between the automotive devices and the identity authorization system. Moreover, most of the automotive devices may not cross vast geographical areas and typically remain in a relatively small geographical region encompassing, for example, a residence, a work place and/or the like of the drivers and/or passengers. The identity authentication may therefore be managed by a significantly localized segment of the overall identity authorization system comprising only few low levels of the AE levels encompassing the significantly limited geographical area travelled by a respective automotive device. This may become even more evident for the stationary automotive devices, for which the identity authentication may possibly be managed by a single lowest level AE as the stationary automotive device may never leave the geographical area in which they are deployed.

In addition, each of the automotive devices may locally store its respective identity certificate thus relieving the identity authorization system from maintaining such identity posture information and constantly or periodically providing it to the automotive devices. This may significantly reduce complexity of the AEs, and may further reduce resources consumption, for example, storage resources, communication resources, computation resources and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
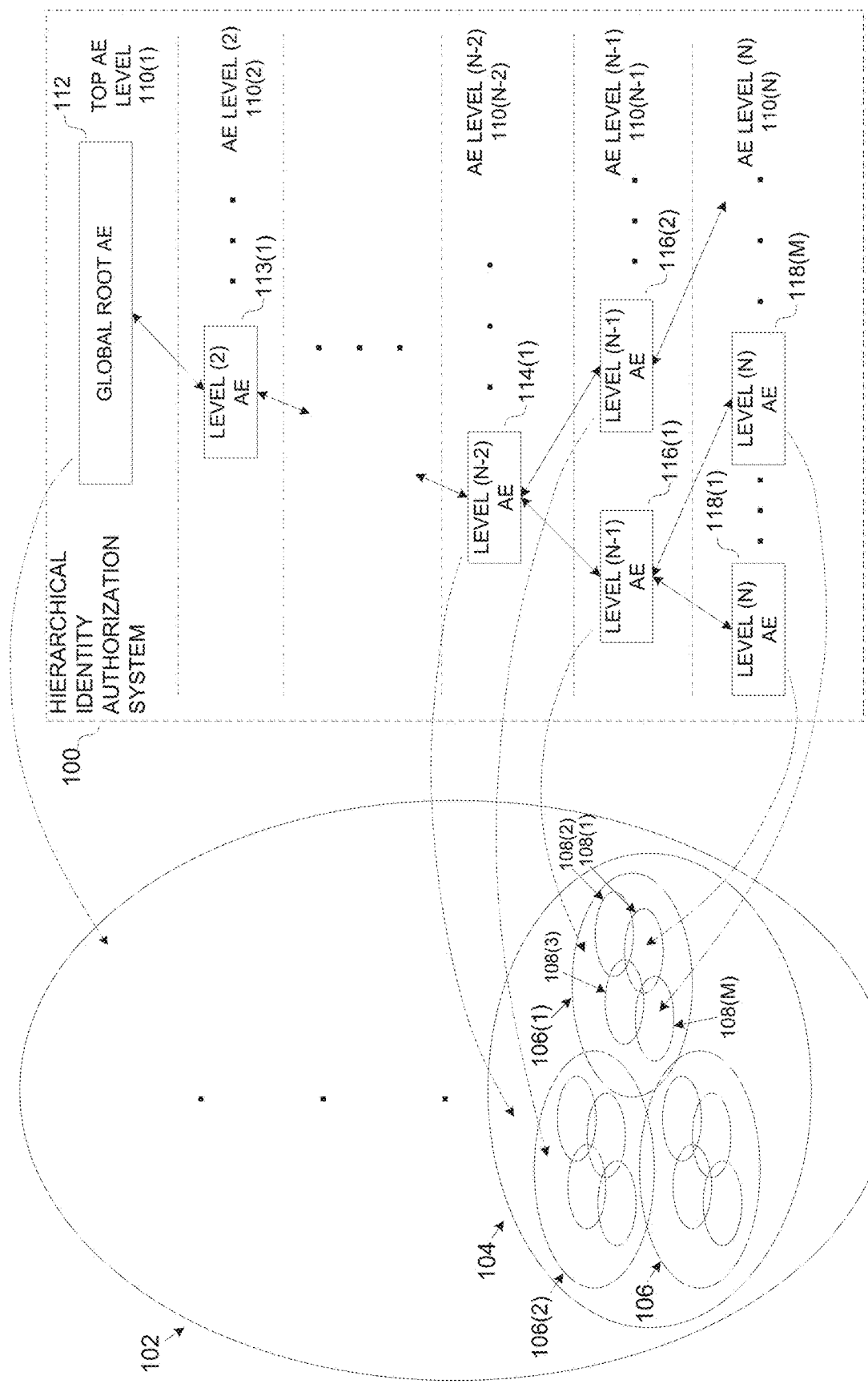
FIG. 1 is a schematic illustration of an exemplary global geographically segmented hierarchical identity authorization system used for evaluating identity posture of automotive devices, according to some embodiments of the present invention.

Referring now to the drawings, FIG. 1 illustrates a schematic illustration of an exemplary global geographically segmented hierarchical identity authorization system used for evaluating identity posture of automotive devices, according to some embodiments of the present invention. An exemplary identity authorization system 100 may be adapted to support identity evaluation for a global automotive environment comprising a plurality of automotive devices which may communicate with each other using one or more V2X (Vehicle-to-everything) protocols, for example, V2I, V2V, V2P, V2D and/or the like. The automotive device may establish the V2X protocols over one or more wireless communication channels, for example, a cellular link (e.g. a 5G network), a WLAN link, a DSRC channel, an RF channel and/or the like.

The automotive devices may include mobile automotive devices, for example, vehicular devices, vehicle mounted devices, pedestrian carried devices and/or the like. The automotive devices may also include stationary automotive devices, for example, road infrastructure objects (traffic lights, traffic signs, crosswalks, etc.), traffic control systems, geolocation identification units and/or the like. Each of the automotive devices may comprises one or more processing devices capable of executing one or more software modules, for example, an application, an agent, a tool, a script and/or the like for communicating with one or more other automotive devices over the V2X channel(s).

Each of the automotive devices may be assigned with a unique identity through an identifier (ID) assigned to it, for example, during production, on deployment, on activation, during maintenance and/or the like. For example, the ID assigned to one or more of the vehicular devices may be based on a Vehicle ID Number (VIN) uniquely assigned to each vehicle during production. In another example, the ID assigned to one or more of the automotive devices may be based on a unique address assigned to a communication element associated with the automotive device, for example, a Media Access Controller (MAC) address and/or the like assigned to each communication element during production.

The automotive devices communicating with each other may need to evaluate and/or determine the identity posture of each other in order to evaluate whether they communicate with a legitimate and reliable automotive device to avoid exposure and/or usage of data provided by malicious devices (adversary) impersonating as legitimate automotive devices and/or unreliable automotive device susceptible to operational failures. The identity authorization system 100 may be trusted by the automotive devices and therefore while communicating with each other, the automotive devices may interact (communicate) with the identity authorization system 100 in order to provide and/or acquire information required for evaluating authenticity of the identity (ID) of one or more of the other automotive devices.

The automotive environment is naturally geographically oriented and the identity authorization system 100 may therefore be constructed as a distributed hierarchical system which is geographical segmented. The identity authorization system 100 may comprise a plurality of AE levels 110 governed by a (global) root AE 112 at a top AE level 110(1). The AEs of a lowest AE level 110 i.e. an AE level 110(N) may be adapted to jointly manage identity authentication for automotive devices located in a global geographical area 102 covering all the geographical areas defined for the identity authorization system 100. Each of the higher AE levels, for example, AE level 110(N−1) through AE level 110(N−2) to AE level 110(2) may include one or more AEs which are each associated with one or more AEs of a subsequent lower AE level 110. For example, an AE 116(1) of the AE level 110(N−1) may be associated with AEs 118(1) through AE 118(M) of the AE level 110(N−1). This may be interpreted such that each AE of a higher AE level 110 may be associated with an extended (larger) geographical area comprising multiple geographically areas associated with AEs of the subsequent lower AE levels 110. However only the AEs of the lowest AE level 110(N) are actually communicating with the automotive devices.

Optionally, the identity authorization system 100 may apply redundancy to verify proper operation and maintain the hierarchical structure in the event of failure(s) to communicate with one or more of the AEs at one or more of the AE levels 110, for example, a loss of communication with the AE, a malfunction of the AE, a maintenance of the AE and/or the like. In such embodiments, the AEs of a lower level may communicate with one or more alternative higher level AEs in the event that their allocated higher level AE is not accessible.

Several embodiments of the identity authorization system 100 are described hereinafter for a global system where the geographical area 102 covers the whole world. In such embodiments the root AE 112 may be associated with the entire world and the AEs of lower AE level 110 are associated with decreasingly smaller geographical areas, for example, a continent, a country and so on. However the presented embodiments should not be construed as limiting as the identity authorization system 100 may be adapted to manage the identity authentication for limited and hence smaller geographical areas 102, for example, a continent, a country and/or the like. In such embodiments, the root AE 112 may therefore be associated with the largest geographical area 102 covering all the geographical areas defined for the identity authorization system 100.

As defined by the hierarchical structure of the identity authorization system 100, each AE of a certain AE level 110 may be associated with an extended geographical area comprising multiple geographically areas associated with AEs of a lower AE level 110. As such the AEs of a lowest AE level, for example, one or more AEs 118 of the AE level 110(N) may be adapted to manage identity authentication for a relatively small geographical area 108, for example, a street, a block and/or the like. For example, an AE 118(1) may be associated with a respective geographical area 108(1) while an AE 118(M) may be associated with a respective geographical area 108(M). AEs of the following higher AE level, for example, one or more AEs 116 of an AE level 110(N−1) may be adapted to manage identity authentication for a larger geographical area 106, for example, a neighborhood, a district, a city sector and/or the like. For example, an AE 116(1) may be associated with a respective geographical area 106(1) while an AE 116(2) may be associated with a respective geographical area 106(2). AEs of the following higher AE level, for example, one or more AEs 114 of an AE level 110(N−2) may be adapted to manage identity authentication for further extended (larger) geographical areas 104, for example, a city, a region and/or the like. The geographical association with the AE levels therefore extends with each higher AE level 110 comprising AEs adapted to manage identity authentication for increasingly larger geographical areas, for example, a county, a province, a canton, a state, a country, a continent and/or the like until reaching a top level AE level 110(1) comprising the root AE 112 which covers the entire geographical area defined for the identity authorization system 100.

The geographical segmentation of the identity authorization system 100, i.e. association of each AE with a respective geographical area may be done according to one or more geographical attributes of the geographical areas, for example, size, population and/or the like. For example, the AEs of one or more AE levels 110 may be associated with geographical areas which are defined according to municipal boundaries. In another example, highly populated geographical areas may be segmented according to population density such that the geographical areas associated with respective AEs of a certain AE level 110 comprise substantially equal population while the size of the geographical areas may vary. The geographical segmentation of the identity authorization system 100 may be further adapted to one or more parameters of the automotive environment, for example, a capacity of automotive devices, a distribution of automotive devices and/or the like. For example, geographical areas characterized with high automotive devices capacity, for example, a city, a suburb, and/or the like may be highly segmented to multiple relatively small geographical areas in order to allow for efficient management of the busy automotive environment characteristic to these geographical areas. Other geographical areas which may be characterized by low automotive devices capacity, for example, a rural area, a country side and/or the like may be segmented to relatively large geographical areas as the load on the AEs associated with such low motive devices capacity may be significantly low.

Additionally and/or alternatively, the identity authorization system 100 may be segmented by a geographical grid, for example, according to longitude and/or latitude lines such that each AE is associated with a respective geographical region having borders defined by longitude and/or latitude point values. In such embodiments, AEs of lower AE levels 110 may be associated with smaller geographical regions and AEs of each following higher AE level 110 associated with increasingly larger geographical regions comprising the geographical regions associated with the AEs of the lower AE levels 110.

The identity authorization system 100 may be distributed such that each of the plurality of AEs, for example, the AEs 118, the AEs 116, the AEs 114, the root AE 112 and/or the like is deployed in its respective geographical area. In such deployments each of the AEs may be utilized by one or more computing devices, for example, a server, a processing node, a cluster of processing nodes and/or the like comprising one or more processors, homogenous or heterogeneous, that may be arranged for parallel processing, as clusters and/or as one or more multi core processor(s). Each of the AEs may further include a storage comprising one or more non-transitory persistent storage devices (e.g. hard drive, Flash array, Solid State Disk, etc.), Random Access Memory (RAM) devices, network storage devices (e.g. storage server, Network Attached Storage, etc.) and/or the like.

Each of the AEs may execute one or more software modules, for example, a process, an application, an agent, a utility and/or the like for managing the identity authentication for automotive devices currently located in the geographical area associated with the respective AE. A software module refers to a plurality of program instructions executed by a processor(s) such as the processor(s) of the AE from storage such as the storage of the AE. The software modules may further include one or more data records, for example, a database, a list, a table and/or the like for maintaining, for example, logging, storing, retrieving and/or the like identity information of the group of automotive devices currently and/or previously located in the geographical area associated with a respective AE.

Each of the AE's may further include one or more network interfaces for connecting to one or more wired and/or wireless networks, for example, a LAN, a WAN, a Wireless LAN (WLAN), a network infrastructure backbone, the Internet 240, a cellular network and/or the like.

Each of the AEs may optionally communicate via the network(s) with one or more other AEs of one or more of the AE levels 110. Specifically, each AE adapted to manage identity authentication in a certain respective geographical area may communicate with its respective higher level AE which is adapted to manage identity authentication in an extended geographical area comprising the certain respective geographical area. For example, the plurality of AEs 118(1) through 118(M) of the AE level 110(N) may communicate with their respective higher level AE, i.e. the AE 116(1) of the AE level 110(N−1). The higher level AE, i.e. the AE 116(1), in turn may communicate with its respective higher level AE, i.e. an AE 114(1). Through the hierarchically chained communications paths derived from the hierarchical structure of the identity authorization system 100, identity information may be propagated up and down between AEs of all AE levels 11 from the root AE 112 to any of the AEs 118 of the lowest AE level 110(N). One or more of the AEs may further communicate with one or more other AEs of the same AE level 110. For example, the AE 118(1) of the AE level 110(N) may communicate with the AE 118(M). In another example, the AE 116(1) of the AE level 110(N−1) may communicate with the AE 116(2). The exchanged identity information may be encrypted to maintain security and/or privacy of the identity information and prevent unauthorized parties from accessing the identity information.

At least some of the AEs, in particular the AEs 118 of the lowest AE level 110(N) may further communicate (interact) with at least some of the plurality of automotive devices to exchange identity data. Specifically, an AE may interact with a group (subset) of automotive devices which are currently located in the respective geographical area the AE is associated with. Such an AE may be designated as a local AE for the group of automotive devices currently located in the geographical area associated with the AE. The exchanged identity data may be encrypted to maintain security and/or privacy of the identity data and prevent unauthorized parties from accessing the identity data. Moreover, the identity data may be signed by one or more AEs of one or more of the AE levels 110 such that the automotive devices may verify the authenticity of the AEs they are communicating with. Each of the AEs may therefore be exclusively associated with a respective encryption key, for example, a public encryption key and/or the like which may be used for encrypting and/or for signing messages comprising the identity data exchanged between the respective AE and one or more of the automotive devices. The encryption keys may be periodically discarded and re-created to reduce probability of the encryption keys being compromised.

The communication (interaction) between the AEs and the automotive devices located in their respective geographical area may typically be done via one or more wireless networks, for example, a Wireless LAN (WLAN, e.g. Wi-Fi, etc.), a cellular network and/or the like. The interaction between the AEs and the mobile automotive devices may naturally be done via the wireless network(s). However, one or more of the AEs may communicate with one or more of the stationary automotive devices located in their respective geographical areas via one or more wired network interfaces, for example, a LAN and/or the like.

In some embodiment of the present invention the identity authorization system 100 and/or part thereof, i.e. one or more of the AEs is implemented as one or more networked services and/or platforms, for example, a cloud service (e.g. Amazon Web Service (AWS), Google Cloud, Microsoft Azure, etc.), a SaaS), a PaaS and/or the like. In such embodiments, one or more AEs of one or more of the AE levels 110 may be utilized by one or more of the networked services and/or platforms. Such AEs may communicate with the group of automotive devices currently located in their respective geographical areas through one or more transceivers deployed in the respective geographical areas.

Optionally, one or more AEs of one or more of the AE levels 110 may be associated with at least partially overlapping geographical areas such that multiple AEs may be adapted to manage identity authentication in geographical locations shared by multiple geographical areas each associated with a different AE of the same AE level 110. For example, as shown in FIG. 1, the AE 118(1) of the AE level 110(N) may be associated with the geographical area 108(1) while the AE 118(M) of the AE level 110(N) may be associated with the geographical area 108(M) which partially overlaps the geographical areas 108(1). Assigning overlapping geographical areas to several AEs of the same AE level 110 may allow for some redundancy in case of failures of one or more of the automotive devices to communicate with one or more of the AEs. Moreover, overlapping between geographical areas may allow for significantly improved scalability of the identity authorization system 100, for example, in case the number of automotive devices (traffic) significantly increases in a certain geographical area, multiple AEs may be associated with at least partially overlapping areas to efficiently manage the identity authorization.

Assigning overlapping geographical areas to several AEs of the same AE level 110 may also significantly reduce intermittent behavior in scenarios in which a mobile automotive device, for example, a vehicle mounted system may be moving in and out of one geographical area to another geographical area each associated with a different AE of the same AE level 110. In case of clear cut borders between the adjacent geographical areas, for example, the first geographical area 108(1) and the second geographical area 108(M), the mobile automotive device may constantly switch interaction between the AE 118(1) and the AE 118(M). Such switching may significantly reduce efficiency of the interaction of the mobile automotive device with the identity authorization system 100 and may further lead to failure of the mobile automotive device to accurately evaluate the identity posture of one or more other automotive devices which may result with no consequences at best and a tragic outcome, for example, an accident involving damage, injuries and/or casualties, at worst. In contrast, when moving through the overlapping geographical areas, the mobile automotive device may interact with a single AE, typically the AE associated with the geographical area of origin of the mobile automotive device, i.e. the geographical area from which the mobile automotive device is arriving.

For example, assuming a certain mobile automotive device is travelling from the first geographical area 108(1) towards and into the second geographical area 108(M). The mobile automotive device may therefore initially interact with the AE 118(1) associated with the first geographical area 108(1) for exchanging information required for identity posture evaluation. While moving deeper into the adjacent second geographical area 108(M), the mobile automotive device may switch to interact with the AE 118(M) associated with the second geographical area 108(M). The intermittent behavior may therefore be significantly reduced and typically completely avoided since the mobile automotive devices may switch interaction between AEs associated with adjacent geographical areas only after travelling significantly and/or sufficiently deep into the newly arrived geographical area.

Figure 2:
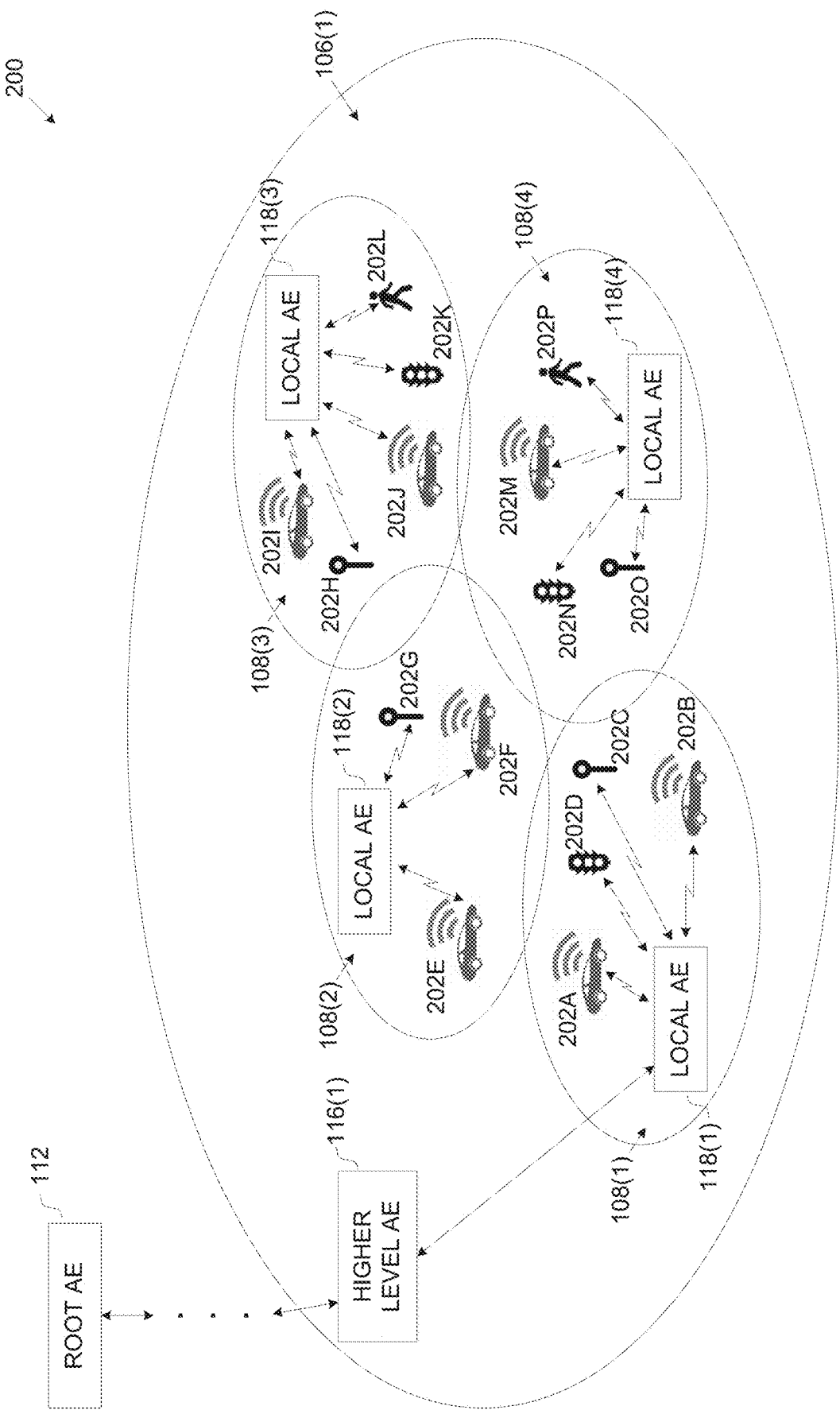
FIG. 2 is a schematic illustration of an exemplary automotive environment in which identity posture of automotive devices is evaluated using a global geographically segmented hierarchical identity authorization system, according to some embodiments of the present invention.

Reference is also made to FIG. 2, which is a schematic illustration of an exemplary automotive environment in which identity posture of automotive devices is evaluated using a global geographically segmented hierarchical identity authorization system, according to some embodiments of the present invention. For brevity, FIG. 2 presents an automotive environment segment 200 which may be only a fraction of an automotive environment using the identity authorization system 100 for evaluating the identity posture of automotive devices. As such, the segment 200 presents only a limited segment of the overall (global) geographical area defined for the identity authorization system 100. Moreover, for clarity, the segment 200 encompasses the most elementary smallest geographical area associated with AEs of the lowest AE levels 110. Specifically, the segment 200 presents a geographical area such as the geographical area 106(1) associated with the AE 116(1) of the AE level 110(N-1) and comprising multiple smaller geographical areas, for example, the geographical areas 108(1), 108(2), 108(3) and 108(4) which are associated with the AEs 118(1), 118(2), 118(3) and 118(4) respectively of the AE level 110(N). However, the description should not be construed as limiting since using the same methods described herein after the limited automotive environment may be expanded to the complete global automotive environment.

A plurality of automotive devices 202, for example, mobile automotive devices and/or stationary automotive devices may be currently located in the geographical area 106(1) associated with the AE 116(1) adapted to manage the identity authentication in the geographical area 106(1). The geographical area 106(1) comprises the plurality of the smaller geographical areas 108(1), 108(2), 108(3) and 108 (4) which are associated with the AEs 118(1), 118(2), 118(3) and 118(4) respectively.

The mobile automotive device 202, for example, automotive devices 202A, 202B, 202E, 202F, 202I, 202J, 202L, 202M and/or 202P may move between different geographical areas and may therefore interact with different AEs associated with the different geographical areas. For example, one or more of the mobile automotive device 202 may travel between the geographical areas 108(1), 108(2), 108(3) and/or 108(4). These mobile automotive device(s) 202 may therefore interact with different AEs, for example, the AEs 118(1), 118(2), 118(3) and/or 118(4) respectively associated with the geographical areas 108(1), 108(2), 108 (3) as they move between the different geographical areas 108.

The mobile automotive device 202 such as the automotive 202A, 202B, 202E, 202F, 202I, 202J, 202L, 202M and/or 202P may include, for example, vehicular devices, vehicle mounted devices, pedestrian carried devices and/or the like. The vehicular devices and/or the vehicle mounted devices may include, for example, an autonomous driving system, a navigation system, a safety system, a communication system and/or the like. The vehicular devices and/or the vehicle mounted devices may further include, for example, a mobile device of a driver of the vehicle, a mobile device of a passenger in the vehicle and/or the like. The pedestrian carried devices may include a geolocation device, for example, a Global Positioning System (GPS), a mobile device (e.g. a Smartphone, a tablet, a smart watch, smart googles, etc.) and/or the like.

The stationary automotive devices 202, for example, automotive device 202C, 202D, 202G, 202H, 202K, 202N and/or 202O may typically be static and hence incapable of moving between geographical areas. As such, each of the stationary automotive devices 202 may typically interact with only a single AE adapted to manage the identity posture evaluation in the geographical area in which the respective stationary automotive device 202 is located. For example, the stationary automotive devices 202C and/or 202D located in the geographical area 108(1) may interact with the AE 118(1) adapted to manage the identity posture evaluation in the geographical area 1080(1). In another example, the stationary automotive devices 202H and/or 202K located in the geographical area 108(3) may interact with the AE 118(3) adapted to manage the identity posture evaluation in the geographical area 108(3).

The stationary automotive devices 202 such as the automotive devices 202C, 202D, 202G, 202H, 202K, 202N and/or 202O may include, for example, road infrastructure objects, traffic control systems, geolocation identification units and/or the like. The road infrastructure object may include, for example, a traffic light, a traffic sign, a crosswalk, a road marking and/or the like. The traffic control system(s) may be deployed to monitor traffic, control traffic, enforce driving regulations and/or the like. The geolocation identification units may be devices adapted to identify and report their exact geolocation position, for example, coordinates, map indication and/or the like.

Each of the automotive devices may include one or more processing devices, for example, a processor, a controller and/or the like capable of executing program instructions from a storage. The storage may include one or more persistent storage devices, for example, a Read Only Memory (ROM), a Flash device, a hard drive, a Solid State Disk and/or the like. The storage may further include one or more volatile devices, for example a RAM devices and/or the like. Each of the automotive devices may thus execute one or more software modules, for example, an application, an agent, a tool, a script and/or the like for communicating with one or more other automotive devices using the V2X channel(s) over one or more wireless communication channels, for example, a cellular link (e.g. a 5G network), a WLAN link (e.g. a Wi-Fi network), a DSRC channel, an RF channel and/or the like.

Each of the automotive devices 202 may have a unique identity expressed by a unique ID. The unique ID of each of the automotive devices 202 may be initially registered in the identity authorization system 100, specifically at the root AE 112. The registration may be done by one or more authorized entities (a human and/or an automated system), for example, a vehicle manufacturer, a system manufacturer, a certified installer and/or the like. The registration may be done through one or more secure procedures in which the identity of the authorized entity may be verified and the registered ID of the automotive device 202 may be also verified. The registration may be done once the automotive device 202 is manufactured, deployed, installed, initialized, activated and/or the like. For example, a certain automotive device 202 such as, for example, a vehicular automotive device may be registered by the authorized vehicle manufacturer. In another example, a certain automotive device 202 such as, for example, a networked (smart) traffic light automotive device may be registered by the authorized installer. During the registration procedure, each of the automotive devices 202 may be assigned with a private encryption key which may be used to authenticate signed identity certificate of the one or more of the AEs and/or of one or more other automotive devices as described herein after.

The automotive devices 202 may communicate with each other through one or more of the V2X protocols and may exchange identity information for evaluating the identity posture of each other in order to determine a legitimacy and/or reliability of the other automotive device. This may be done by exchanging identity information between automotive devices 202. However, the automotive devices 202 may not attest for their own legitimacy and/or reliability since such implementation may be highly exposed to manipulation, infiltration, deception and/or the like by one or more malicious devices operated by an adversary. The identity authorization system 100 may serve as an independent entity trusted by the automotive devices 202 to enforce reliable evaluation and reporting of the confidence level in the identity and/or reliability of the automotive devices 202.

However, in order to use the identity authorization system 100 each of the automotive devices 202 may first need to establish trust with the identity authorization system 100, specifically with a local AE adapted to manage the identity posture evaluation in an associated geographical area in which the automotive device 202 is currently located. This means that the automotive device 202 needs to verify the identity of the local AE.

Figure 3:
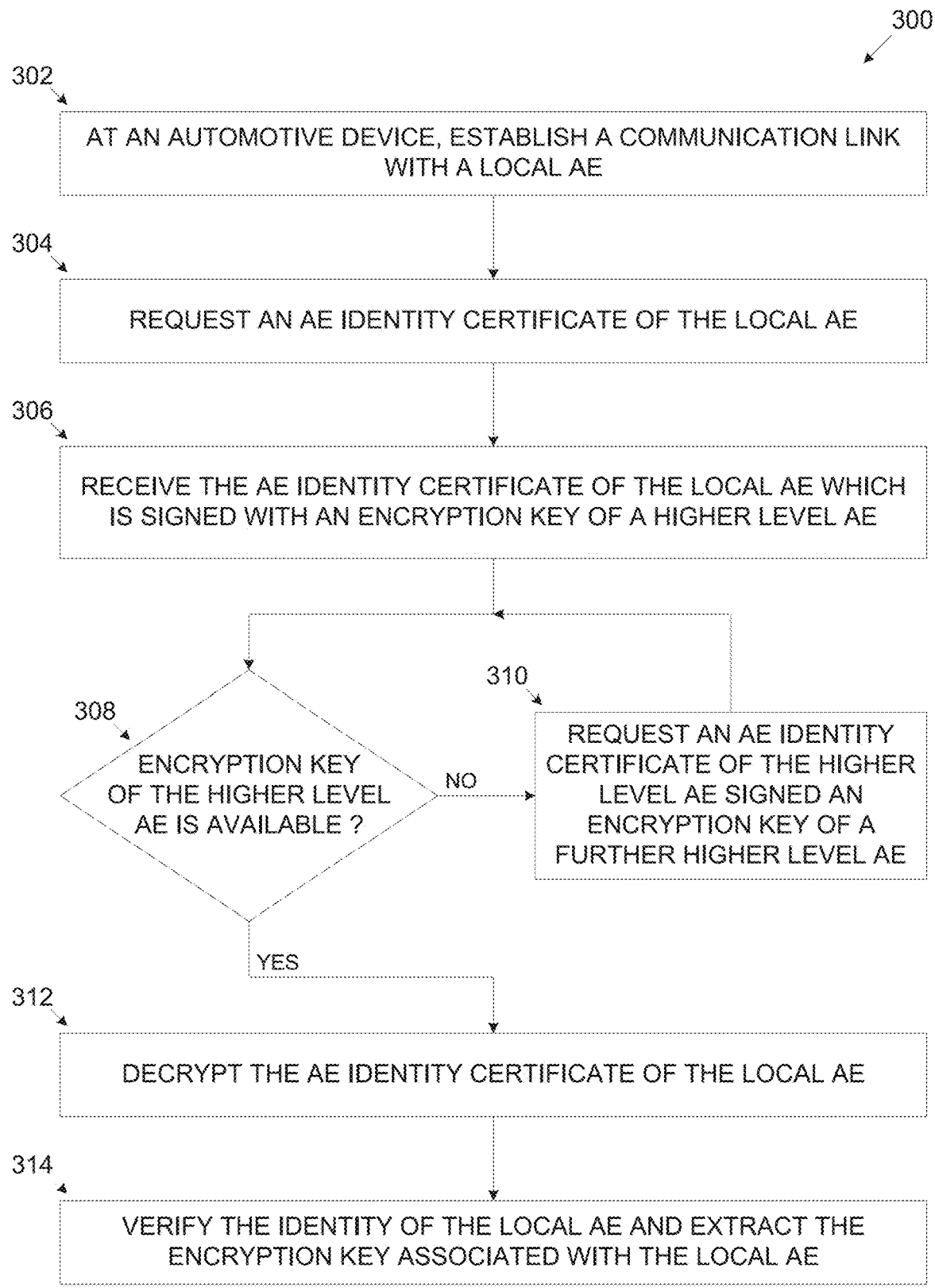
FIG. 3 is a flowchart of an exemplary process executed by an automotive device for verifying an identity of a local AE, according to some embodiments of the present invention.

Reference is now made to FIG. 3, which is a flowchart of an exemplary process executed by an automotive device for verifying an identity of a local AE, according to some embodiments of the present invention. An exemplary process 300 may be executed by one or more automotive devices such as the automotive devices 202 for verifying the identity of its local AE to assure that the local AE is a valid AE of an identity authorization system 100 such as the identity authorization system 100 and may thus be trusted. The process 300 may be executed by one or more of the automotive devices 202 interacting with their respective local AE. For example, an automotive device such as the automotive device 202A currently located in a certain geographical area, for example, the geographical area 108(1). The automotive device 202A may therefore interact (communicate) with the local AE of a lowest AE level 110(N), i.e. the AE 118(1) associated with the geographical area 108(1) and adapted to manage the identity posture evaluation in the geographical area 108(1).

The process 300 may typically take place when the automotive device 202A enters the geographical area 108(1) for the first time. As it is the first time the automotive device 202A enters the geographical area 108(1), the automotive device 202A may need to first verify the identity of the AE 118(1) such that data received and/or validated by the AE 118(1) may be trusted by the automotive device 202A. Moreover, executing the process 300, the automotive device 202A may identify which of the AEs currently performs as its local AE.

The process 300 may also be executed by the automotive device 202A after first registered to the identity authorization system 100. In such case the local AE, for example, the AE 118(1) is the AE associated with the geographical area of origin of the automotive device 202A, in this case the geographical area 108(1). The geographical area of origin may include, for example, an area in which the automotive device is manufactured, an area in which the automotive device is deployed, an area in which the automotive device is installed, an area in which the automotive device is activated and/or the like. For example, assuming the automotive device 202A is a vehicle manufactured in a factory located in the geographical area 108(1), the automotive device 202A may initiate the process 300 for verifying the identity of the AE 118(1) associated with the geographical area 108(1). In another example, assuming the automotive device 202A is a networked traffic light capable of reporting operational attributes of the traffic light, for example, a state (i.e. red, yellow, green) a time until state switch and/or the like deployed in the geographical area 108(1). The automotive device 202A may therefore initiate the process 300 for verifying the identity of the AE 118(1) associated with the geographical area 108(1).

As shown at 302, the automotive device 202A establishes a communication link with the local AE 118(1) using one or more communication protocols established over one or more networks, for example, the WLAN (e.g. Wi-Fi), the cellular network and/or the like.

As shown at 304, the automotive device 202A requests the AE 118(1) to provide its AE identity certificate (i.e. the identity certificate of the AE 118(1)) comprising an identity posture score calculated for the AE 118(1). The AE identity certificate of the AE 118(1) may further include the encryption key exclusively associated with the AE 118(1).

The identity posture score may indicate the robustness and/or vulnerability of the AE 118(1) to one or more malicious operations and/or cyber threats, for example, a cyber-attack, an identity theft, hijacking, compromising and/or the like. The identity posture score may also indicate the robustness and/or vulnerability of the AE 118(1) to unintentional failures, for example, software failures, incorrect data generation and/or delivery and/or the like. The identity posture score may be calculated for one or more identity security attributes of the AE 118(1), for example, a software module executed by the automotive device AE 118(1) (e.g. an Operating System, an application, etc.), a version of the software module, a patch level and/or version for the software module, a security measure applied by the AE 118(1) (e.g. a firewall, an IPS, an anti-virus tool, an anti-malware tool and/or any other relevant protection suite), a version of the security measure, a performance of a feature of the AE 118(1) (e.g. a geolocation measurement accuracy, etc.), a performance of a hardware component used by the AE 118(1) (e.g. a positioning sensor, etc.) and/or the like. The identity posture score may be expressed in a plurality of formats and/or scales, for example, in a scale of 0 to 100 where 0 is the lowest score and 100 is the highest score. The score 0 may indicate that the confidence level in the identity of the AE 118(1) is extremely low and the score 100 may indicate that the confidence level in identity of the AE 118(1) is extremely high.

Since the AE 118(1) is part of the infrastructure of the identity authorization system 100 and is therefore constantly maintained, monitored and/or protected, the identity posture score assigned to the AE 118(1) should be significantly high, for example, 100.

The AE identity certificate of the AE 118(1) may be signed by a higher level AE of the subsequent higher AE level 110, in this case the AE 116(1) of the AE level 110(N−1). In this context, the term signed indicates that the AE 116(1) encrypts the AE identity certificate of the AE 118(1) using the encryption key exclusively associated with the AE 116(1).

As shown at 306, the automotive device 202A receives the signed AE identity certificate of the AE 118(1) from the AE 118(1).

As shown at 308, it is a decision point. In case the automotive device 202A already has the encryption key associated with the AE 116(1), the process 300 branches to 312. In case the automotive device 202A does not have the encryption key associated with the AE 116(1), the process 300 branches to 310.

As shown at 310, the automotive device 202A requests the AE 118(1) to provide the AE identity certificate of the AE 116(1) in order for the automotive device 202A to first establish trust with the AE 116(1), i.e. verify the identity of the AE 116(1). The AE identity certificate of the AE 116(1) comprises the identity posture score calculated for the AE 116(1) and further includes the encryption key exclusively associated with the AE 116(1).

This iterative sequence, in which the automotive device 202A established trust, i.e. verifies the identity of the next higher level AE, may propagate up (along the relevant branch of the hierarchical structure of the identity authorization system 100) towards higher level AEs until reaching an AE with which the automotive device 202A has already established trust, i.e. previously verified its AE identity. The iterative sequence may optionally repeat until reaching the root AE 112 which is known and trusted by all automotive devices 202 registered to the identity authorization system 100.

Optionally, the identity authorization system 100 applies redundancy to verify proper operation and maintain the hierarchical structure of the system in the event of failure(s) to communicate with one or more of the AEs at one or more of the AE levels 110, for example, a loss of communication with the AE, a malfunction of the AE, a maintenance of the AE and/or the like. In such case, the iterative process may propagate along another branch of the hierarchical structure of the identity authorization system 100 through one or more alternative higher AEs associated with the AE 118(1) and/or with one or more higher level AEs associated with the AE 118(1). Therefore, in case one of the lower level AEs, for example, the AE 118(1), the AE 116(1), the AE 114(1) and so on is unable to communicate with its associated higher level AE, the lower level AEs may communicate with the alternative higher level AE(s) to get their AE identity certificates signed by the alternative higher level AE(s).

During the iterative sequence, the automotive device 202A verifies the identity of the respective AE of a certain AE level 110 according to the AE identity certificate of the respective AE which is signed by the respective higher level AE. For example, the AE identity certificate of the AE 118(1) is signed by the AE 116(1), the AE identity certificate of the AE 116(1) is signed by the AE 114(1) and so on until reaching the AE 113(1) having its AE identity certificate signed by the root AE 112.

When reaching a certain AE which is trusted by the automotive device 202A, the automotive device 202A may use the encryption key of the trusted AE to decrypt the AE identity certificate of the subsequent lower level AE, verify the identity of the subsequent lower level AE and extract its associated encryption key. In case the root AE 112 is reached, the AE identity certificate of the AE of the subsequent lower AE level 110(2), for example, the AE 113(1) may be signed with the encryption key of the root AE 112. Encryption key information relating to root AE 112, for example, a public encryption key of the root AE 112 was shared with the automotive device 202A during the initial registration of the automotive device 202A to the identity authorization system 100. The automotive device 202A may therefore use the public encryption key of the root AE 112 to decrypt the AE identity certificate of the AE 113(1) and thus authenticate the identity of the AE 113(1).

Eventually, through the iterative sequence, the automotive device 202A may recursively establish trust (i.e. verify the identity) of each subsequent lower level AE along the relevant branch of the hierarchical structure of the identity authorization system 100 until reaching back to the AE 116(1) and obtaining the encryption key associated with the AE 116(1).

As shown at 312, after obtaining the encryption key of the AE 116(1), the automotive device 202A may decrypt the AE identity certificate of the local AE, i.e. the AE 118(1) and extract the identity posture score assigned to the AE 118(1).

As shown at 314, based on the identity posture score assigned to the AE 118(1), the automotive device 202A may verify the identity of the AE 118(1) and establish trust with the AE 118(1). As discussed before, since the AE 118(1) is part of the infrastructure of the identity authorization system 100, the identity posture score of the AE 118(1) should be significantly high, for example, 100.

The automotive device 202A may further extract the encryption key associated with the AE 118(1) from the AE identity certificate of the AE 118(1).

Optionally, the automotive device 202A locally stores (caches) the encryption key of the local AE, in this case the AE 118(1). The automotive device 202A may use the encryption key of the AE 118(1) for future communication session with one or more of the other automotive devices 202 in the geographical area 108(1) in which identity data exchanged between the automotive devices 202 is signed with the encryption key of the AE 118(1).

The AE 118(1) may periodically change its encryption key to reduce the probability and potentially completely prevent the encryption key from being compromised. The time period for expiration of the public encryption key may be set for a predefined constant time period and/or for randomly selected time periods. Upon expiration of the predefined time period, the AE 118(1) may be associated with a new encryption key. One or more automotive device 202, for example, the automotive device 202A that interact with the AE 118(1) may therefore need to first obtain the newly updated (created) encryption key of the AE 118(1) by re-initiating the process 300.

Similarly, each of the higher level AEs, for example, the AE 116(1), the AE 114(1), the AE 113(1) and/or the like may periodically change their associated respective encryption key. Once the encryption key of one or more of the higher level AE(s) is changed, one or more of the automotive devices 202, for example, the automotive device 202A that interacts with the AE 118(1) may need to follow the iterative sequence of the process 300 to obtain the newly updated (created) encryption key of the respective AE(s).

Figure 4A:
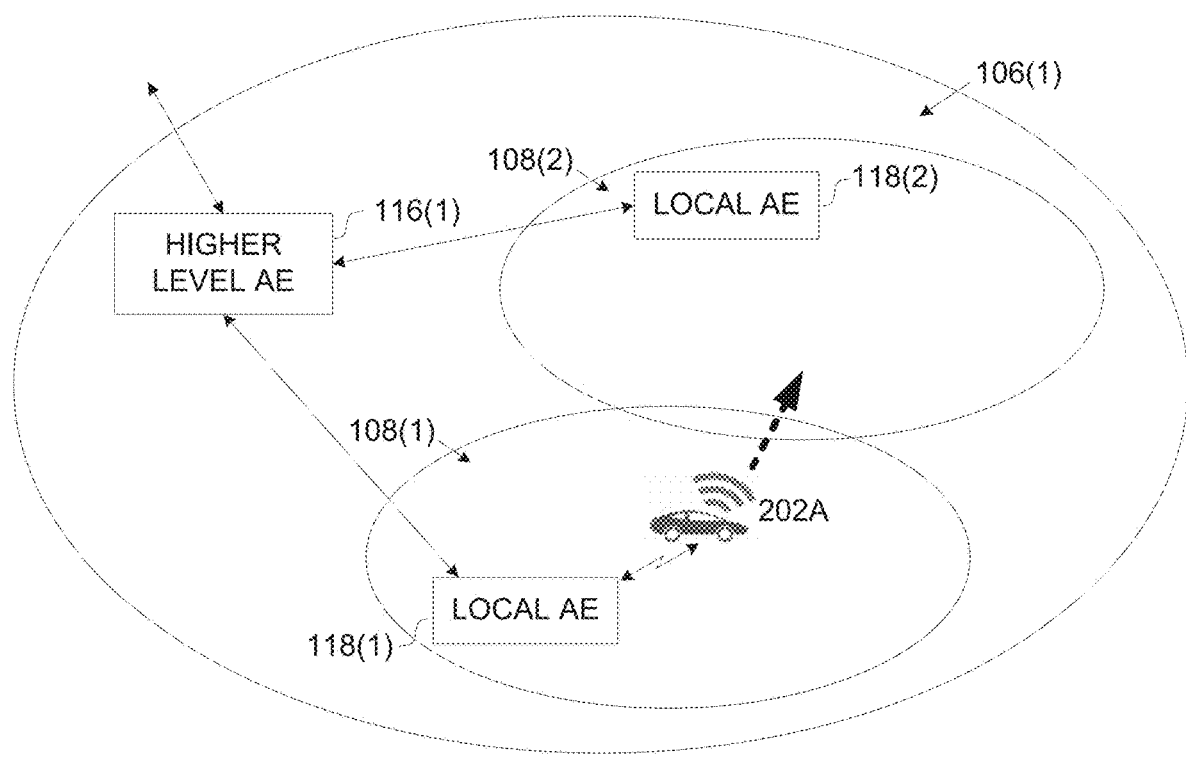
FIG. 4A and FIG. 4B are schematic illustrations of an exemplary automotive environment supported by geographically segmented hierarchical identity authorization system in which a mobile automotive device travels between adjacent geographical areas, according to some embodiments of the present invention.
Figure 4B:
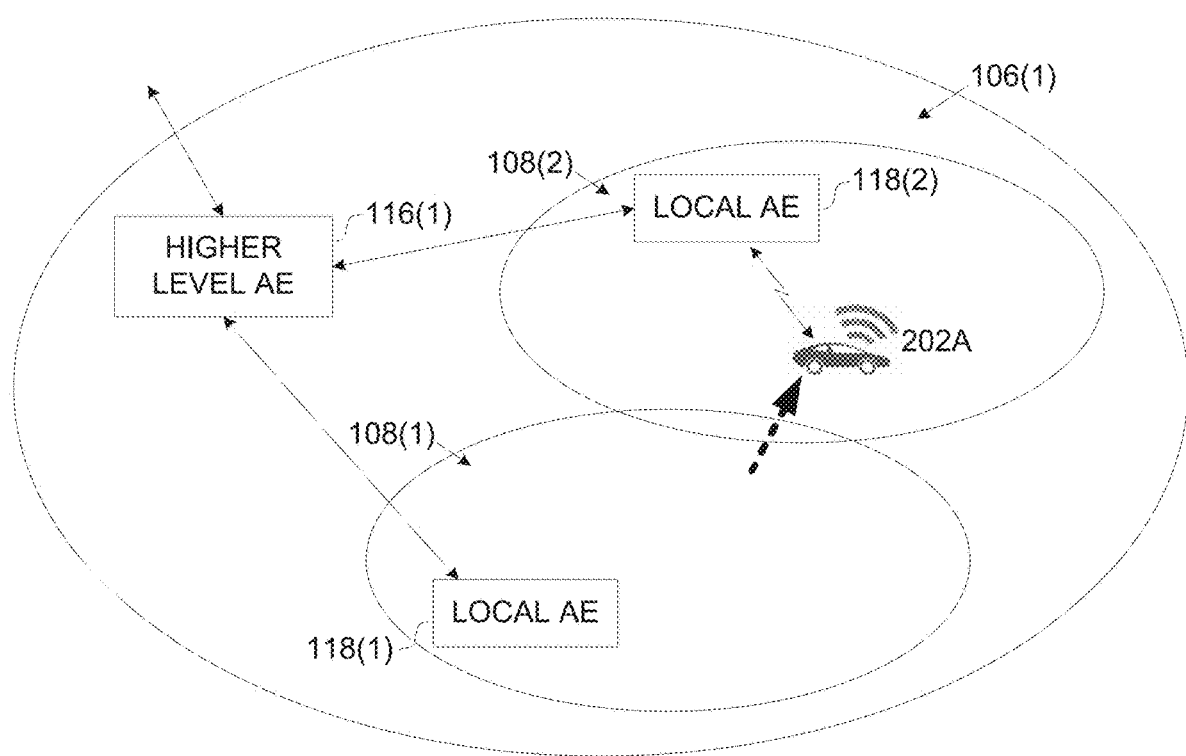

Reference is now made to FIG. 4A and FIG. 4B, which are schematic illustrations of an exemplary automotive environment supported by geographically segmented hierarchical identity authorization system in which a mobile automotive device travels between adjacent geographical areas, according to some embodiments of the present invention. As shown in FIG. 4A a mobile automotive device such as the automotive device 202A, is currently located in a certain geographical area, for example, the geographical area 108(1) which is associated with a local AE such as the AE 118(1). It is assumed that the automotive device 202A already established trust with the AE 118(1) through by executing a process such as the process 300 and may therefore have the encryption key of the AE 118(1).

The automotive device 202A may travel from the geographical area 108(1) towards another geographical area, typically an adjacent geographical area such as the geographical area 108(2).

As shown at FIG. 4B, after entering the geographical area 108(2), the automotive device 202A may need to interact with the AE 118(2) associated with the geographical area 108(2). Since the automotive device 202A may not be familiar with the AE 118(2), the automotive device 202A needs to execute the process 300 in order to verify the identity of the AE 118(2). As described in the process 300, the AE identity certificate of the AE 118(2) is signed by the subsequent higher level AE, i.e. the AE 116(1) using the encryption key associated with the AE 116(1).

In case the automotive device 202A has the encryption key of the AE 116(1), the automotive device 202A may use this encryption key to decrypt the AE identity certificate of the AE 118(2). In case the automotive device 202A does not have the encryption key of the AE 116(1), the automotive device 202A may apply one or more iterations of the iterative process 300 to verify the identity of the AE 116(1). Once the automotive device 202A establishes trust with the AE 116(1), i.e. verifies the identity of the AE 116(1) is valid (legitimate), the automotive device 202A may use the encryption key of the AE 116(1) to decrypt the AE identity certificate of the AE 118(2).

Reference is now made to FIG. 4A and FIG. 4B, which are schematic illustrations of an exemplary automotive environment supported by geographically segmented hierarchical identity authorization system in which a mobile automotive device travels between adjacent geographical areas, according to some embodiments of the present invention.

As shown in FIG. 4A a mobile automotive device such as the automotive device 202A, in particular a mobile automotive device 202A is currently located in a first geographical area, for example, the geographical area 108(1) which is associated with a local AE such as the AE 118(1). The automotive device 202A may travel from the geographical area 108(1) towards another geographical area, typically an adjacent geographical area such as the geographical area 108(2).

The automotive device 202A currently located in the geographical area 108(1) may had already interacted with the local AE 118(1), and therefore the automotive device 202A had established trust with the AE 118(1), i.e. verified the identity of the AE 118(1) through a process such as the process 300. Moreover, while executing the process 300, the automotive device 202A may had also verified the identity of the respective subsequent higher level AE which is AE 116(1) meaning that the automotive device 202A established trust with the AE 116(1).

As shown in FIG. 4B, the automotive device 202A enters the geographical area 108(2) and starts interacting with a local AE associate with the geographical area 108(2) such as the AE 118(2). Assuming it is the first time the automotive device 202A is in the geographical area 108(2), the automotive device 202A needs to execute the process 300 to verify the identity of the local AE 118(2) and establish trust with the AE 118(2). The automotive device 202A already verified the identity of the respective subsequent higher level AE associated with the local AE 118(2) which is also AE 116(1). The process 300 executed by the automotive device 202A may therefore include a single iteration in which the automotive device 202A received the AE identity certification of the AE 118(2) signed by the AE 116(1). The automotive device 202A may thus decrypt the AE identity certification of the AE 118(2) using the encryption key associated with the AE 116(1) which is already available to the automotive device 202A. After decrypting the AE identity certification of the AE 118(2), the automotive device 202A may verify the identity of the local AE 118(2) according to the identity posture score assigned to the local AE 118(2) and hence establish trust in the local AE 118(2).

Figure 5:
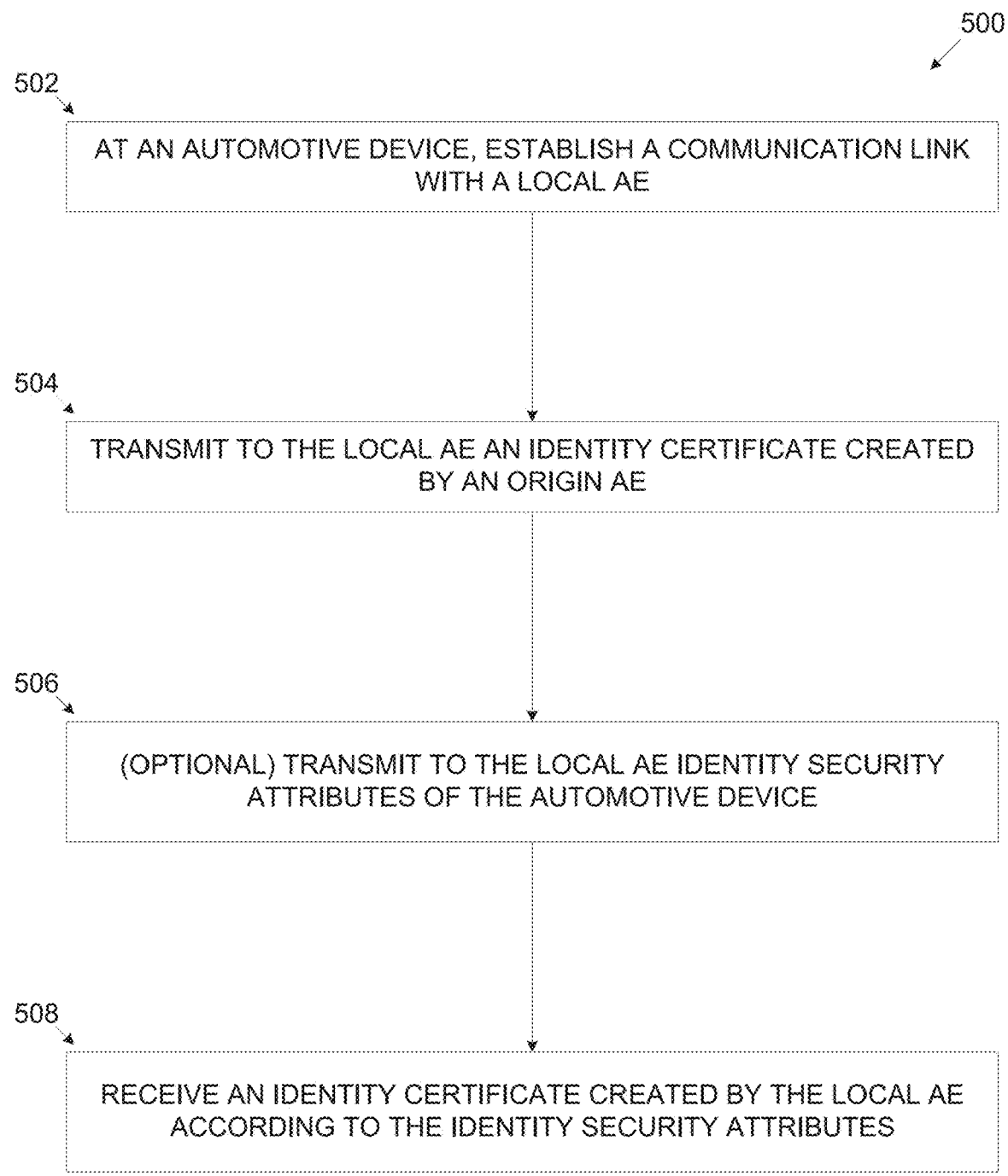
FIG. 5 is a flowchart of an exemplary process executed by an automotive device for obtaining an identity certificate created for the automotive device by a local AE, according to some embodiments of the present invention.

Reference is now made to FIG. 5, which is a flowchart of an exemplary process executed by an automotive device for obtaining an identity certificate created for the automotive device by a local AE, according to some embodiments of the present invention. An exemplary process 500 may be executed by one or more automotive devices such as the automotive devices 202 interacting with their respective local AE of an identity authorization system such as the identity authorization system 100. For example, an automotive device such as the automotive device 202A currently located in a certain geographical area, for example, the geographical area 108(1). The automotive device 202A may therefore interact (communicate) with the local AE of a lowest AE level 110(N), i.e. the AE 118(1) associated with the geographical area 108(1) and adapted to manage the identity posture evaluation in the geographical area 108(1).

The automotive device 202A may communicate with the local AE 118(1) to obtain an identity certificate created for the automotive device 202A by the local AE 118(1) which reflects the confidence level in the authenticity of the ID of the automotive device 202A. While communicating with one or more of the other automotive devices 202, the automotive device 202A may provide its identity certificate indicating its identity posture thus allowing the other automotive device(s) 202 to evaluate the legitimacy, reliability and/or robustness of the automotive device 202A.

The process 500 may typically be executed by the automotive device 202A after entering the geographical area 108(1) associated with the AE 118(1) for the first time. Moreover, the process 500 may be executed by the automotive device 202A after the automotive device 202A completes a process such as the process 300 in which the automotive device 202A verifies the identity of the local AE 118(1).

As shown at 502, the automotive device 202A establishes a communication link with the local AE 118(1) using one or more communication protocols established over one or more networks, for example, a WLAN (e.g. Wi-Fi, etc.), a cellular network and/or the like.

As shown at 504, which is an optional step, the automotive device 202A transmits to the local AE 118(1) a most recent identity certificate created for the automotive device 202A by an origin AE. For example, as shown in FIG. 4A and FIG. 4B, the automotive device 202A travels from the geographical area 108(1) to the geographical area 108(2). While in the geographical area 108(1), the AE 118(1) associated with the geographical area 108(1) is the local AE for the automotive device 202A. After entering the geographical area 108(2), the AE 118(2) associated with the geographical area 108(2) may become the local AE for the automotive device 202A. The geographical area 108(1) may therefore be regarded as the origin AE of the automotive device 202A.

The AE 118(1) may authenticate the signature of the origin AE through the hierarchical structure of the identity authorization system 100. For example, the AE 118(1) may initiate a request to obtain the encryption key associated with the origin AE. The request may propagate through one or more higher level AEs residing on the path between the origin AE and the AE 118(1). After obtaining the encryption key of the origin AE, the AE 118(1) may authenticate the most recent identity certificate and verify the automotive device 202A is a legitimate automotive device 202 registered in the identity authorization system 100.

In case the automotive device 202A has no prior identity certificate, for example, it is the first interaction of the automotive device 202A with any AE, since registered to the identity authorization system 100, the request initiated by the AE 118(1) may propagate all the way to a root AE such as the root AE 112 which may authenticate the identity (ID) of the automotive device 202A.

As shown at 506, the automotive device 202A transmits to the local AE 118(1) one or more identity security attributes of the automotive device 202B, for example, a type of the automotive device 202A, a software module executed by the automotive device 202B (e.g. an Operating System, an application, etc.), a version of the software module, a patch level and/or version for the software module, a security measure applied by the automotive device 202B (e.g. a firewall, an IPS, an anti-virus tool, an anti-malware tool and/or any other relevant protection suite), a version of the security measure, a performance of a feature of the automotive device 202B (e.g. a geolocation measurement accuracy, distance measurement accuracy, light measurement accuracy, etc.), a performance of a hardware component used by the automotive device 202B (e.g. a positioning sensor, a distance sensor, an acceleration sensor, a light sensor, etc.) and/or the like. The identity security attributes may further include a time period since the most recent creation of the identity certificate for the automotive device 202A by one of the AEs of the identity authorization system 1000.

The AE 118(1) may create the identity certificate for the automotive device 202A based on the identity security attribute(s) received from the automotive device 202A. The identity certificate may include a feature vector in which the AE 118(1) calculates an identity posture score for one or more of the identity security attributes of the automotive device 202A. The identity posture score calculated by the AE 118(1) may indicate the robustness and/or reliability provided by the respective identity security attribute. The identity posture score(s) calculated for the identity security attribute(s) may thus be indicative of the vulnerability of the automotive device 202A to malicious operations, cyber threats and/or the like. The identity posture score(s) may also be indicative of the susceptibility of the automotive device 202A to operational failures. The identity posture score(s) may also be indicative of the performance of the automotive device 202A, for example, data accuracy, data time delay and/or the like.

The identity posture score may be expressed in a plurality of formats and/or scales, for example, a scale of 0 to 100 where 0 is the lowest score and 100 is the highest score. The score 0 indicates that the respective identity security attribute may reflect high vulnerability of the automotive device 202A to malicious operations, cyber threats and/or high susceptibility of the automotive device 202A to operational failures. In contracts, the score 100 indicates that the respective identity security attribute may reflect low vulnerability of the automotive device 202A to malicious operations, cyber threats and/or low susceptibility of the automotive device 202A to operational failures.

For example, assuming a certain identity security attribute describes a certain software module executed by the automotive device 202A, for example, a control application. In case the certain identity security attribute indicates that the automotive device 202A executes the latest version of the control application including the latest relevant patch(es), the AE 118(1) may assign a high identity posture score for the certain identity security attribute. The high identity posture score reflecting that the automotive device 202A executing the most updated control application is estimated to be significantly robust against the unintentional failures.

In another example, assuming a certain identity security attribute describes a certain security measure applied by the automotive device 202A, for example, firewall. In case the certain identity security attribute indicates that the automotive device 202A applies the latest version of the firewall and continuously maintains the firewall, the AE 118(1) may assign a high identity posture score for the certain identity security attribute. The high identity posture score reflecting that the automotive device 202A applying and maintaining the most updated firewall is estimated to be significantly immune to the cyber-attack(s) and/or malicious operation(s).

In another example, assuming a certain identity security attribute describes a certain geolocation measure used by the automotive device 202A, for example, a positioning sensor such as for example a GPS sensor. In case the certain identity security attribute indicates that the automotive device 202A uses a relatively low accuracy positioning sensor, the AE 118(1) may assign a low identity posture score for the certain identity security attribute. The low identity posture score reflecting that the automotive device 202A may provide relatively low accuracy positioning information.

In another example, assuming a certain identity security attribute describes the time period since the most recent creation of the identity certificate for the automotive device 202A by one of the AEs of the identity authorization system 100. Based on the time period, the AE 118(1) may calculate the identity posture score for the for the certain identity security attribute. The time period may indicate a frequency of evaluation of the identity posture of the automotive device 202A by the identity authorization system 100. Frequent evaluation may be indicative of a reliable, legitimate automotive device while infrequent evaluation may be indicative of a less reliable and potentially compromised automotive device. The identity posture score assigned by the AE 118(1) for the certain identity security attribute may therefore be proportional to the time period indicated by the certain identity security attribute. The shorter the time period is, the higher may be the identity posture score assigned for the certain identity security attribute and vice versa. For example, assuming the time period since the most recent identity certificate creation is significantly long, for example, 6 months, the AE 118(1) may assign a low identity posture score for the certain identity security attribute. In contrast, assuming the time period since the most recent verification of the automotive device 202B ID is short, for example, a day, the AE 118(1) may assign a high identity posture score for the certain identity security attribute.

The AE 118(1) may further aggregate and/or compile the identity posture score calculated separately for some and optionally all of the identity security attributes to an overall identity posture score. Similarly to the identity posture score calculated for the identity security attributes, the overall identity posture score may also be expressed in the scale of 0 to 100 where 0 is the lowest score and 100 is the highest score. The score 0 may indicate that the confidence level in the identity posture of automotive device 202A is extremely low since the automotive device 202A is evaluated to be susceptible to failures and/or vulnerable to malicious operations and/or cyber threats. The score 100 on the other hand, may indicate that the confidence level in the identity posture of automotive device 202A is extremely high since the automotive device 202A is evaluated to be highly immune to the failures and to the cyber threats.

The AE 118(1) may further assign a time stamp to the identity certificate indicating the time of creation of the identity certificate.

The AE 118(1) may encrypt the identity certificate using its associated encryption key and transmit the identity certificate to the automotive device 202A.

As shown at 508, the automotive device 202A receives the created identity certificate from the AE 118(1) and locally stores it.

The automotive device 202A may locally store (cache) its identity certificate received from the AE 118(1) for an extended period of time. In such case when initiating a communication session with one or more of the other automotive devices 202, the automotive device 202B may already have its identity certificate locally available thus avoiding the need to request (in real-time) the identity certificate from the AE 118(1).

However, the identity certificate may be valid for a predefined time period such that upon expiration of the predefined time period the identity certificate may be rejected by the other automotive device(s) 202. The time stamp included in the identity certificate may be used by the other automotive device(s) 202 to enforce the validity of the identity certificate. Based on the time stamp, the other automotive device(s) 202 may reject the identity certificate in case the predefined time period since the time indicated by the time stamp has expired.

Therefore, upon expiration of the predefined time period, the automotive device 202A may initiate the process 500 again requesting the AE 118(1) to re-create the identity certificate. This may be done to verify that changes in the identity security attributes of the automotive device 202A are updated in the re-created identity certificate thus assuring a reliable and up to date identity certificate.

Reference is now made to FIG. 6, which is a flowchart of an exemplary process executed by an automotive device to establish a communication session with another automotive device based on an identity posture score assigned to the other automotive device by a local AE, according to some embodiments of the present invention. Reference is also made to FIG. 7, which is a schematic illustration of an exemplary automotive environment in which an automotive device establishes a communication session with another automotive device based on an identity posture score assigned to the other automotive device by a local AE, according to some embodiments of the present invention.

An exemplary process 600 may be executed by one or more automotive devices such as the automotive devices 202, for example, the automotive device 202A to establish a communication session with one or more other automotive devices, for example, the automotive device 202B. The automotive device 202A may establish the communication session with the automotive device 202B according to evaluation of an identity posture assigned to the automotive device 202B by a local AE, for example the AE 118(1) associated with a respective geographical area, specifically the geographical area 108(1) in which the automotive device 202A and the automotive device 202B are currently located.

The process 600 may be initiated periodically between the automotive device 202A and 202B to mutually re-valuate each other's identity posture and make sure that changes in their identity security attributes are accurately reflected in updated identity certificates created for the automotive device 202A and/or 202B by the AE 118(1).

The data exchanged between the automotive devices 202A and 202B during the communication session may be used for making critical decisions. For example, in the case of the autonomous driving system(s), such decisions which may be based on data received from the other automotive device(s) 202 may lead to or alternatively prevent collisions, accidents, damage, injuries and/or casualties.

It may therefore be essential for one automotive device 202 to evaluate the identity posture of the other automotive device 202 and use the exchanged data according to a confidence level in the identity of the other automotive device 202. This may significantly reduce the probability and potentially completely prevent use of data received from a malicious device, for example, an adversary device, a compromised automotive device 202 and/or the like impersonating as a legitimate automotive device 202. This may also significantly reduce the probability and potentially completely prevent use of data received from an unreliable device which may suffer poor performance and/or operational failures.

The process 600 is described for the automotive device 202A (first automotive device) evaluating the identity posture of the automotive device 202B (second automotive device) using the identity authorization system 100. However the automotive devices 202A and 202B may be equivalent where each of the automotive devices 202A and 202B may need to evaluate the identity posture of the other automotive device 202B and 202A with which it communicates. The process 600 may therefore be executed by both automotive devices, typically simultaneously to mutually evaluate each other's identity posture.

The process 600 may typically be conducted between the automotive devices 202A and 202B after both the automotive devices 202A and 202B have established trust with the local AE 118(1) by executing a process such as the process 300. In addition, the process 600 is typically conducted between the automotive devices 202A and 202B after both the automotive devices 202A and 202B have obtained their respective identity certificates created by the local AE 118(1) by executing a process such as the process 500.

As shown at 602, the process 600 starts with the first automotive device, for example, the automotive device 202A establishing a communication link with the second automotive device, for example, the automotive device 202B for the purpose of data exchange. The communication link may utilize one or more of the V2X protocols for example, the V2V protocol over one or more of the wireless communication channels, for example, the cellular link (e.g. the 5G network), the WLAN link (e.g. the Wi-Fi network), the DSRC channel, the RF channel and/or the like.

As shown at 604, the automotive device 202A requests from the automotive device 202B the identity certificate created for automotive device 202B by the local AE 118(1) as described in the process 500.

As shown at 606, the automotive device 202A decrypts the identity certificate received from the automotive device 202B to extract the identity posture score calculated by the local AE 118(1) for the automotive device 202B.

As described herein above, the identity certificate received from the automotive device 202B is signed, for example, encrypted by the local AE 118(1) using the encryption key of the local AE 118(1). As the automotive device 202A verified the identity of the AE 118(1) by executing the process 300, the AE 118(1) is trusted as a legitimate AE by the automotive device 202A. Moreover, during the process 300, the automotive device 202A has obtained the encryption key associated with the local AE 118(1). The automotive device 202A may therefore use the encryption key of the local AE 118(1) to decrypt the identity certificate received from the automotive device 202B and extract the identity posture score calculated for the automotive device 202B by the local AE 118(1).

As shown at 608, the automotive device 202A may establish a communication session with the automotive device 202B according to the evaluated identity posture as expressed by the identity posture score(s) retrieved from the identity certificate received from the automotive device 202B. The automotive device 202A may establish the communication session with the automotive device 202B and use data received from the automotive device 202B according to identity posture score calculated by the local AE 118(1) for one or more of the identity security attributes of the automotive device 202B. The automotive device 202A may further base the decision on whether to communicate and/or use data received from the automotive device 202B on the overall identity posture score aggregating the identity posture score calculated for multiple and optionally all of the identity security attributes of the automotive device 202B. Naturally, the higher the identity posture score(s) and/or the overall identity posture score calculated for the automotive device 202B, the more confidence the automotive device 202A may have to share information with the automotive device 202B and use data received from the automotive device 202B. On the other hand, the lower the identity posture score(s) and/or the overall identity posture score calculated for the automotive device 202B, the automotive device 202A may be more reluctant to share information with the automotive device 202B and/or to use data received from the automotive device 202B.

For example, the automotive device 202A may be an autonomous vehicle system which may control a vehicle, for example, ignite, turn-off, accelerate, break, turn and/or the like. Decisions taken by such an autonomous vehicle 202A system may therefore be critical as they may lead to collisions, accidents, injuries and/or casualties. The autonomous vehicle system 202A may base these decisions on input data, for example, geolocation data received from the automotive device 202B which may be for example, a vehicle mounted system installed in another vehicle. The autonomous vehicle system 202A may therefore evaluate the identity posture score assigned to one or more identity security attributes of the vehicle mounted system 202B, for example, a geolocation capability, a GPS sensor and/or the like. In such case, the autonomous vehicle system 202A may use the data received from the vehicle mounted system 202B only if the identity posture score of the geolocation capability, a GPS sensor exceeds a significantly high threshold value, for example, 95 (for the scale of 0 to 100).

In another example, the automotive device 202A may again be the autonomous vehicle system controlling a vehicle. Assuming the autonomous vehicle system 202A communicates with the automotive device 202B which may be, for example, a networked traffic light capable of reporting operational attributes of the traffic light, for example, a state (i.e. red, yellow, green) a time until state switch and/or the like. In such case, the autonomous vehicle system 202A may evaluate the overall identity posture score assigned to the networked traffic light 202B to verify that the networked traffic light 202B is a genuine networked traffic light which is not compromised by an adversary. Decision(s) taken by the autonomous vehicle system 202A based on the input data received from the networked traffic light 202B may be critical. The autonomous vehicle system 202A may therefore use the data received from the networked traffic light 202B only if the overall identity posture score of the traffic light exceeds a significantly high threshold value, for example, 95 (for the scale of 0 to 100). In another example, the automotive device 202B may be a networked crosswalk capable of reporting whether pedestrians are currently waiting to cross a road, a street and/or the like. Similarly to the previous example, the autonomous vehicle system 202A may use the data received from the networked crosswalk 202B only if its identity posture score exceeds the significantly high threshold value of 95 (for the scale of 0 to 100).

In another example, the automotive device 202A may be a navigation system installed in a vehicle which may select, suggest and/or control a route of the vehicle. Decisions taken by such a navigation system 202A may not be highly critical but may still have a major impact on the ride of the vehicle. The navigation system 202A may base its decisions on data received from one or more other automotive devices such as the automotive device 202B, for example, a traffic control system capable of reporting of traffic load in one or more geographical areas such as the geographical area 108(1). In such case, the navigation system 202A may use the data received from the traffic control system 202B if the identity posture score of the traffic control system 202B exceeds a relatively high threshold value, for example, 75 (for the scale of 0 to 100).

In another example, assuming the automotive device 202A may be a multimedia system installed in a vehicle which may play and/or present audio and/or video presentations to a driver and/or a passenger in the vehicle. The multimedia system 202A may receive presentation data from one or more other automotive devices such as the automotive device 202B, for example, a networked commercial advertisement billboard capable of providing real-time advertisement content. Decisions taken by the multimedia system 202A may not be critical at all. In such case, the multimedia system 202A may use the data received from the networked commercial advertisement billboard 202B if the overall identity posture score calculated for the networked commercial advertisement billboard 202B exceeds a relatively low threshold value, for example, 40 (for the scale of 0 to 100).

It is expected that during the life of a patent maturing from this application many relevant systems, methods and computer programs will be developed and the scope of the terms V2X communication protocols and/or channels are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of evaluating authenticity of automotive devices, comprising:

using at least one processor of a local authorization entity (AE) which is part of a geographically segmented hierarchical identity authorization system adapted to manage identity authentication of a plurality of automotive devices of a global automotive environment, the local AE is adapted to manage the identity authentication for a group of the plurality of automotive devices currently located in an associated geographical area, the at least one processor is adapted for:

receiving from a first automotive device of the group, over a network, a request for an AE identity certificate of the local AE; and providing the AE identity certificate to the first automotive device, the AE identity certificate comprising an identity posture score and an encryption key of the local AE is signed with an encryption key of a higher level AE, the first automotive device decrypts the AE identity certificate using the encryption key of the higher level AE to retrieve the identity posture score and the encryption key of the local AE;

wherein, after verifying the identity of the local AE based on the identity posture score of the local AE, the first automotive device uses the encryption key of the local AE to verify an identity certificate received from a second automotive device of the group via at least one communication channel, the identity certificate comprises an identity posture score calculated for the second automotive device by the local AE and signed using the encryption key of the local AE, and wherein the first automotive device establishes a communication session with the second automotive device according to the identity posture score.

2. The computer implemented method of claim 1, wherein the hierarchical identity authorization system comprises a top level (root) global AE and a plurality of AE levels, each of the plurality of AE levels comprising a plurality of AEs, each of the AEs in the a lowest AE level is adapted to manage the identity posture evaluation for a group of the plurality of automotive devices currently located in a respective associated geographical area, each higher level AE is associated with a plurality of lower level AEs.

3. The computer implemented method of claim 2, wherein each of the plurality of automotive devices is initially registered at the root AE which assigns a unique encryption key to each automotive device.

4. The computer implemented method of claim 2, further comprising at least some of the plurality of AEs of at least one of the plurality of AE levels are associated with at least partially overlapping geographical areas.

5. The computer implemented method of claim 2, further comprising at least one lower level AE is associated with an alternative higher level AE which signs the AE identity certificate of the lower level AE in case the higher level AE is not accessible.

6. The computer implemented method of claim 1, wherein the first automotive device repeats the request for the AE identity certificate of the higher level AE signed with an encryption key of a further higher level AE until reaching an AE having an encryption key available to the first automotive device.

7. The computer implemented method of claim 1, wherein the local AE calculates the identity posture score for at least one identity security attribute of at least one automotive device of the group, the at least one identity security attribute is a member of a group consisting of: a type of the at least one automotive device, a software module executed by the at least one automotive device, a version of the software module, a security measure applied by the at least one automotive device, a version of the security measure, a performance of a feature of the automotive device, a performance of a hardware component used by the automotive device and a time period since a most recent verification of the identity of the at least one automotive device.

8. The computer implemented method of claim 7, further comprising the local AE calculates an overall identity posture score by aggregating the identity posture score calculated for a plurality of identity security attributes of the at least one automotive device.

9. The computer implemented method of claim 1, further comprising the local AE:

calculates the identity posture score for each automotive device of the group when each automotive device enters the associated geographical area for a first time, and provides the identity certificate comprising the identity posture score to each automotive device.

10. The computer implemented method of claim 1, wherein the identity certificate of the second automotive device is valid for a predefined time period after which the identity certificate is rejected by the first automotive device.

11. The computer implemented method of claim 1, wherein the first automotive device requests the AE identity certificate of the local AE when entering the associate geographical area for a first time.

12. The computer implemented method of claim 1, wherein the first automotive device stores the encryption key of the local AE for decrypting the identity certificate of at least one automotive device of the group for establishing a communication session with the at least one automotive device.

13. The computer implemented method of claim 1, further comprising the encryption key of the local AE expires every predefined time period to force the first automotive device to periodically request an updated encryption key from the local AE.

14. The computer implemented method of claim 1, wherein each of the plurality of automotive devices is a member of a group consisting of: a mobile automotive device and a stationary automotive device.

15. The computer implemented method of claim 14, wherein the mobile automotive device is a vehicle mounted device comprising at least one member of a group consisting of: a vehicular device and a pedestrian carried device.

16. The computer implemented method of claim 14, wherein the stationary automotive device is a member of a group consisting of: a road infrastructure object and a traffic control system, wherein the road infrastructure object comprises at least one member of a group consisting of: a road sign, a traffic light, a road marking and a geolocation identification unit.

17. A system for evaluating authenticity of automotive devices, comprising:

at least one processor of a local authorization entity (AE) which is part of a geographically segmented hierarchical identity authorization system adapted to manage identity authentication of a plurality of automotive devices of a global automotive environment, the local AE is adapted to manage the identity authentication for a group of the plurality of automotive devices currently located in an associated geographical area, the at least one processor is adapted to execute a code, the code comprising;

code instructions to receive from a first automotive device of the group, over a network, a request for an AE identity certificate of the local AE; and code instructions to provide the AE identity certificate to the first automotive device, the AE identity certificate comprising an identity posture score and an encryption key of the local AE is signed with an encryption key of a higher level AE, the first automotive device decrypts the AE identity certificate using the encryption key of the higher level AE to retrieve the identity posture score and the encryption key of the local AE;

wherein, after verifying the identity of the local AE based on the identity posture score of the local AE, the first automotive device uses the encryption key of the local AE to verify an identity certificate received from a second automotive device of the group via at least one communication channel, the identity certificate comprises an identity posture score calculated for the second automotive device by the local AE and signed using the encryption key of the local AE, and wherein the first automotive device establishes a communication session with the second automotive device according to the identity posture score.

* * * * *